(12) United States Patent
Ryu et al.

(10) Patent No.: US 12,478,238 B2
(45) Date of Patent: Nov. 25, 2025

(54) CLEANER STATION AND METHOD FOR CONTROLLING THE SAME

(71) Applicant: LG Electronics Inc., Seoul (KR)

(72) Inventors: Jungwan Ryu, Seoul (KR); Daeho Chang, Seoul (KR); Donggeun Lee, Seoul (KR)

(73) Assignee: LG Electronics Inc., Seoul (KR)

(*) Notice: Subject to any disclaimer, the term of this patent is extended or adjusted under 35 U.S.C. 154(b) by 338 days.

(21) Appl. No.: 18/248,333

(22) PCT Filed: Oct. 6, 2021

(86) PCT No.: PCT/KR2021/013687
§ 371 (c)(1),
(2) Date: Apr. 7, 2023

(87) PCT Pub. No.: WO2022/075736
PCT Pub. Date: Apr. 14, 2022

(65) Prior Publication Data
US 2023/0371770 A1   Nov. 23, 2023

(30) Foreign Application Priority Data

Oct. 8, 2020   (KR) .................. 10-2020-0130066

(51) Int. Cl.
A47L 9/28       (2006.01)
A47L 7/00       (2006.01)
A61L 2/08       (2006.01)
A61L 2/10       (2006.01)

(52) U.S. Cl.
CPC .......... *A47L 9/2873* (2013.01); *A47L 7/0061* (2013.01); *A61L 2/088* (2013.01); *A61L 2/10* (2013.01); *A61L 2202/11* (2013.01); *A61L 2202/17* (2013.01); *A61L 2209/12* (2013.01); *A61L 2209/14* (2013.01)

(58) Field of Classification Search
CPC ...... A47L 9/2873; A47L 7/0061; A61L 2/088; A61L 2/10; A61L 2202/11; A61L 2202/17; A61L 2202/12; A61L 2202/14
See application file for complete search history.

(56) References Cited

FOREIGN PATENT DOCUMENTS

KR   20070012109 A  *  1/2007  .......... A47L 9/2873

OTHER PUBLICATIONS

KR20070012109A(machine translation) (Year: 2007).*

* cited by examiner

*Primary Examiner* — Andrew A Horton
(74) *Attorney, Agent, or Firm* — Fish & Richardson P.C.

(57) ABSTRACT

A cleaner station suctions dust stored in a cleaner into the inside thereof and a method for controlling the cleaner station. The cleaner station includes: a housing which is coupled to a cleaner; a dust collection motor which is received within the housing and generates a suction force to suck dust within a dust bin of the cleaner; a dust collector which is received within the housing, is disposed above the dust collection motor, and collects the dust sucked from the inside of the dust bin by the dust collection motor; and a collector external sterilization unit which is received within the housing and is provided to cause a sterilization reaction on foreign substances present outside the dust collector.

20 Claims, 18 Drawing Sheets

CLEANER STATION AND METHOD FOR CONTROLLING THE SAME

CROSS-REFERENCE TO RELATED APPLICATIONS

This application is a National Stage application under 35 U.S.C. § 371 of International Application No. PCT/KR2021/013687, filed on Oct. 6, 2021, which claims the benefit of Korean Application No. 10-2020-0130066, filed on Oct. 8, 2020. The disclosures of the prior applications are incorporated by reference in their entirety.

TECHNICAL FIELD

The present disclosure relates to a cleaner station that sucks dust stored in a cleaner into the inside thereof and a method for controlling the cleaner station, and more particularly to a cleaner station which is equipped with a collector external sterilization unit capable of causing a sterilization reaction outside the dust collector and provides hygienic convenience to a user, and to a method for controlling the cleaner station.

BACKGROUND ART

In general, a cleaner is a home appliance which sucks small garbage or dust in a way of sucking air by using electricity and fills the garbage or dust in a dust bin included in the cleaner product. The cleaner is usually called a vacuum cleaner.

Such a cleaner can be divided into a manual cleaner which performs cleaning by being moved directly by a user and an automatic cleaner which performs cleaning while travels by itself. The manual cleaner can be divided into a canister vacuum cleaner, an upright vacuum cleaner, a hand vacuum cleaner, and a stick vacuum cleaner, etc., in accordance with the shape thereof.

In the past, the canister vacuum cleaner has been used widely as a household cleaner. However, recently, the hand vacuum cleaner and the stick vacuum cleaner, which include a dust bin formed integrally with the body of the cleaner and provides improved convenience for use, tend to be used a lot.

In the case of the canister vacuum cleaner, the body and the suction port thereof are connected by a rubber hose or pipe. In some cases, the cleaner can be used in such a way that a brush is inserted into the suction port.

The hand vacuum cleaner has the maximized portability, and thus, has a light weight and a short length. Therefore, the cleaning area of the cleaner may be limited. Accordingly, the hand vacuum cleaner is used to clean a local place such as on a desk or sofa, the inside of a vehicle.

The stick vacuum cleaner allows a user to use itself with a standing posture, and thus, the cleaning can be made without bending his/her waist forward. Therefore, it is advantageous for cleaning while moving over a wide area. While the handy vacuum cleaner cleans a narrow space, the stick vacuum cleaner is able to clean a wider space than the narrow space and to clean a high place out of reach. Recently, the stick vacuum cleaner is provided in the form of a module, so that the type of the cleaner is actively changed according to various objects.

However, in the stick vacuum cleaner, since the dust bin that stores the collected dust has a small capacity, it is inconvenient for the user to empty the dust bin every time.

In order to solve the problem, Korean Patent Application No. 10-2020-0074001 as a prior art document discloses a cleaning device including a vacuum cleaner and a docking station.

The prior art document includes a vacuum cleaner including a dust collection container which collects foreign substances, and a docking station which is connected to the dust collection container in order to remove the foreign substances collected in the dust collection container. The dust collection container is docked to the docking station. The docking station is configured to include a suction device for sucking the foreign substances and internal air within the dust collection container docked to the docking station.

In addition, according to the prior art document, a collector that collects the foreign substances within the docking station is included.

However, the docking station disclosed in the prior art document has a problem that the foreign substances which are collected to the collector are left as they are until the foreign substances fills the capacity of the collector. Bacteria are easy to grow within the collector due to the foreign substances left as they are in the dark interior space for a long time. The growing bacteria may cause odors. As a result, odors spread from the air which is exhausted through the collector, causing the user to feel uncomfortable.

Also, the bacteria may grow to the outside of the collector due to the contamination of the inside of the collector. When the user replaces the collector, the outer surface of the collector contacts with the user's hand, so that the user may feel uncomfortable.

DISCLOSURE

Technical Problem

The purpose of the present disclosure is to provide a cleaner station equipped with means capable of causing a sterilization reaction in various areas of the cleaner station and a method for controlling the cleaner station.

Specifically, the purpose of the present disclosure is to provide a cleaner station capable of hygienic management by sterilizing the outer surface of a dust collector.

Also, specifically, the purpose of the present disclosure is to provide a cleaner station which includes a means for sterilizing air sucked together with dust into the cleaner station before the air is exhausted, and thus, is able to remove odors from the exhaust air.

Also, specifically, the purpose of the present disclosure is to provide a means for sterilizing the inside of a dust bin of a cleaner after a process of collecting dust in the dust bin of the cleaner is completed, thereby providing a user with convenience for hygiene management of the cleaner.

Technical Solution

One embodiment is a cleaner station including: a housing which is coupled to a cleaner; a dust collection motor which is received within the housing and generates a suction force to suck dust within a dust bin of the cleaner; a dust collector which is received within the housing, is disposed above the dust collection motor, and collects the dust sucked from the inside of the dust bin by the dust collection motor; and a collector external sterilization unit which is received within the housing and is provided to cause a sterilization reaction on foreign substances present outside the dust collector.

The collector external sterilization unit may include an ionizer configured to generate ions.

The cleaner station may further include a HEPA filter which is received within the housing, is disposed below the dust collection motor, and filters foreign substances from air sucked by the dust collection motor. The ionizer may be disposed above the HEPA filter.

The cleaner station may further include a dust collector housing which is received within the housing and has an interior space to which the dust collector is coupled. The ionizer may be coupled to the dust collector housing and may generate the ions in a space between an outer wall of the dust collector and an inner wall of the dust collector housing.

The ionizer may be disposed on a top surface of the dust collector housing.

In the cleaner station, the collector external sterilization unit may include: a photocatalyst filter which is received within the housing and includes a photocatalyst that responds to visible light; and a photocatalyst LED which is disposed below the photocatalyst filter and emits visible light.

The cleaner station may further include a HEPA filter which is received within the housing, is disposed below the dust collection motor, and filters foreign substances from air sucked by the dust collection motor. The HEPA filter may be disposed between the photocatalyst filter and the photocatalyst LED, and the photocatalyst LED may emit visible light in a direction in which the photocatalyst filter is disposed.

The cleaner station may further include a suction tube which is received within the housing and forms a space through which air flows such that, when the dust collection motor generates a suction force, the dust within the dust bin is collected to the dust collector. The collector external sterilization unit may include a dust bin sterilization LED which is disposed in the suction tube and emits ultraviolet light.

Here, when the dust bin is coupled to the housing, the dust bin sterilization LED may be disposed at a position facing a bottom surface of the dust bin.

Another embodiment is a method for controlling a cleaner station which is coupled to a cleaner and includes a dust collection motor that generates a suction force for collecting dust within a dust bin of the cleaner. The method may include: determining whether a dust bin sterilization mode in which the dust bin is sterilized is set after driving of the dust collection motor is completed; opening a door provided in the cleaner station such that an outside and an inside of the cleaner station communicate with each other, when the dust bin sterilization mode is set; opening an exhaust cover which opens and closes the dust bin; and emitting ultraviolet light toward an inside of the dust bin by a dust bin sterilization LED provided within the cleaner station.

Further another embodiment is a method for controlling a cleaner station which is coupled to a cleaner in order to remove dust within a dust bin of the cleaner. The method may include: collecting the dust within the dust bin to a dust collector of the cleaner station by driving of a dust collection motor received within the cleaner station; and generating, by an ionizer provided in the cleaner station, ions in a space between an outer wall of the dust collector and an inner wall of a dust collector housing which receives the dust collector.

Here, the method may further include, after the collecting the dust and before the generating the ions, determining whether an ion generation mode in which ions are generated by the ionizer is set.

Advantageous Effect

According to the embodiment of the present disclosure, an ionizer that generates ions in a space between an outer wall of a dust collector and an inner wall of a dust collector housing is provided, so that foreign substances present on an outer surface of the dust collector are sterilized, and thus, the cleaner station can be hygienically managed.

Also, according to the embodiment of the present disclosure, since a photocatalyst filter is coupled to a top of a HEPA filter, a photocatalyst reaction can occur before air sucked together with dust into the cleaner station is exhausted, thereby removing odors from the exhaust air.

Also, according to the embodiment of the present disclosure, a dust bin sterilization LED that emits ultraviolet light in a state where the cleaner is coupled to the cleaner station after a process of collecting dust in the dust bin of the cleaner is completed is provided in the dust bin of the cleaner, so that the foreign substances present within the dust bin of the cleaner are sterilized, thereby providing a user with convenience for hygiene management of the cleaner.

MODE FOR INVENTION

Figure 1:
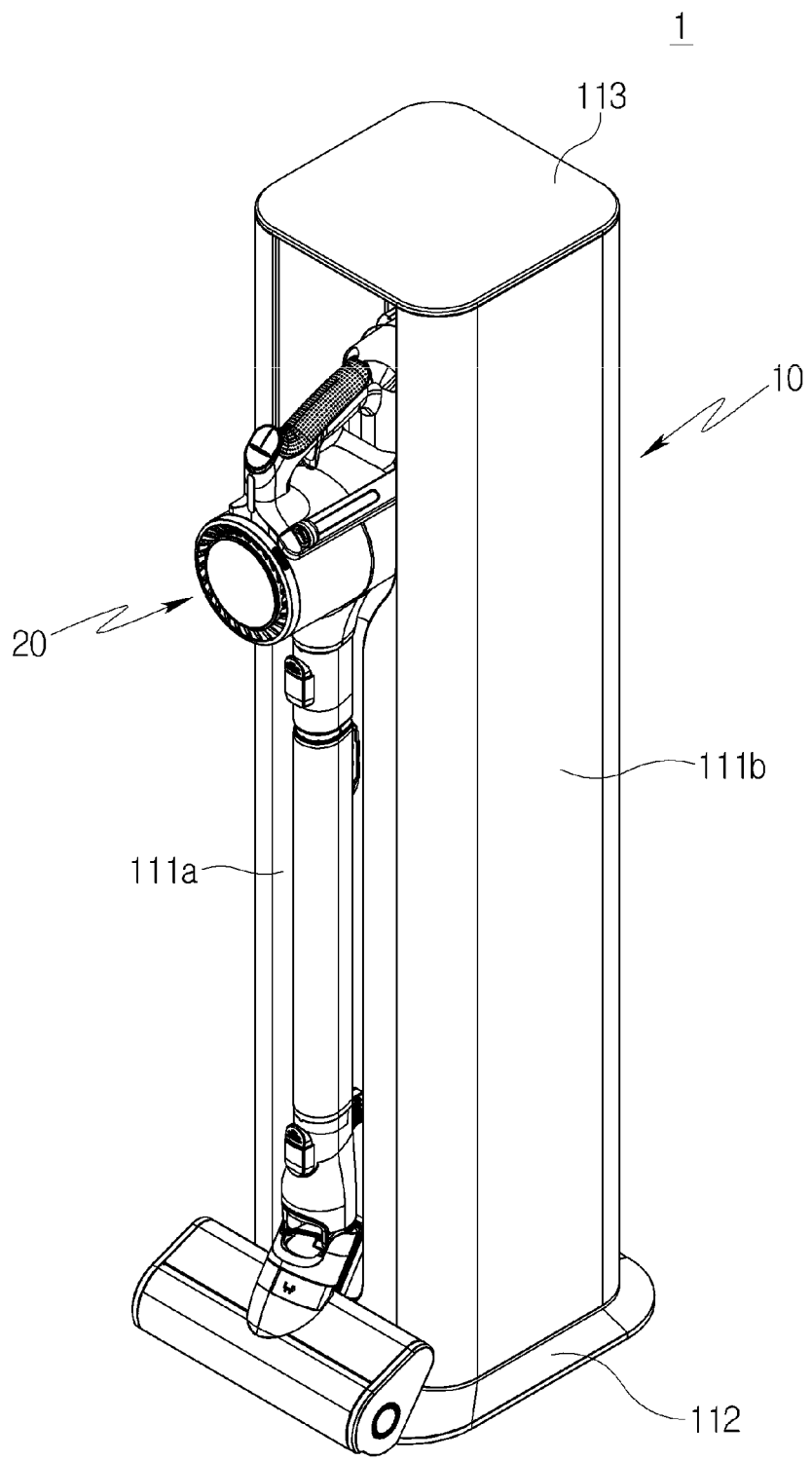
FIG. 1 is a perspective view showing a cleaner system including a cleaner station and a cleaner according to an embodiment of the present disclosure.

Hereinafter, preferred embodiments of the present disclosure will be described in detail with reference to the accompanying drawings.

As the present disclosure can have various embodiments as well as can be diversely changed, specific embodiments will be illustrated in the drawings and described in detail. While the present disclosure is not limited to particular embodiments, all modification, equivalents and substitutes included in the spirit and scope of the present disclosure are understood to be included therein.

In the description of the present disclosure, while terms such as the first and the second, etc., can be used to describe various components, the components may not be limited by the terms mentioned above. The terms are used only for distinguishing between one component and other components. For example, the first component may be designated as the second component without departing from the scope of rights of the invention. Similarly, the second component may be designated as the first component.

The term of "and/or" includes a combination or one of a plurality of related items mentioned.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

Terms used in the present specification are provided for description of only specific embodiments of the present disclosure, and not intended to be limiting. An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics.

Unless otherwise defined, all terms used herein including technical and scientific terms have the same meaning as commonly understood by one of ordinary skill in the art to which the present disclosure belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Also, the embodiment is provided for giving those skilled in the art more complete description. Therefore, the shapes and sizes and the like of components of the drawings may be exaggerated for clarity of the description.

Figure 2:
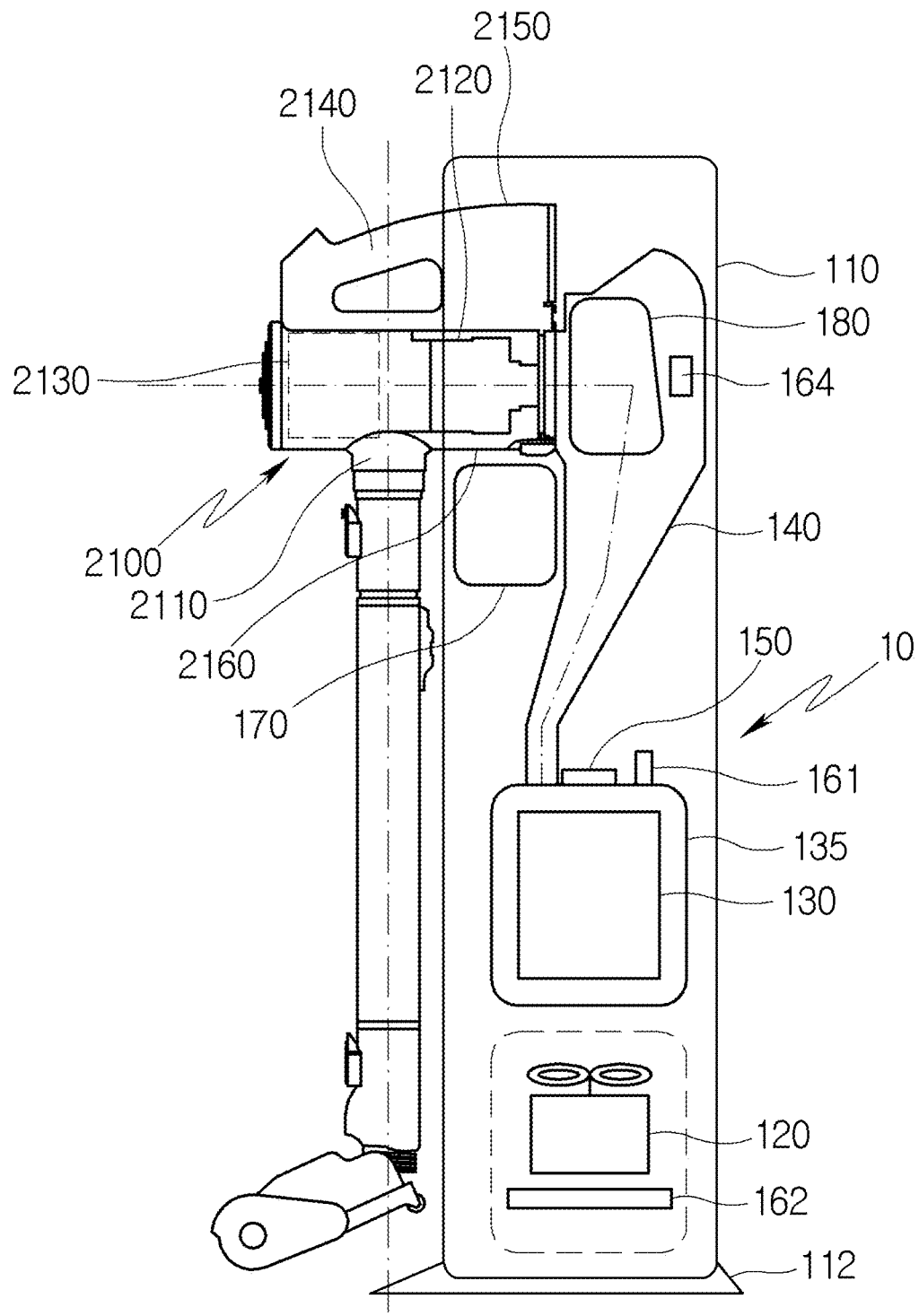
FIG. 2 is a view showing a shape in which the cleaner is coupled to the cleaner station and a side inside of the cleaner station.
Figure 3:
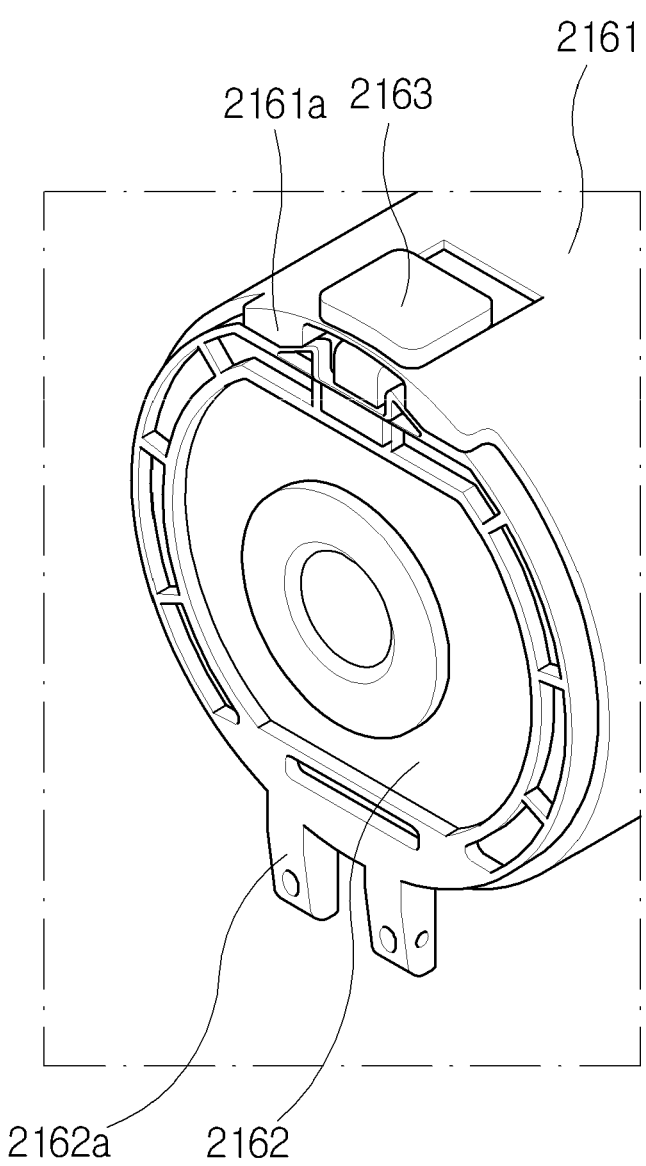
FIG. 3 is an enlarged view of an opening and closing structure of a dust bin of the cleaner.
Figure 4:
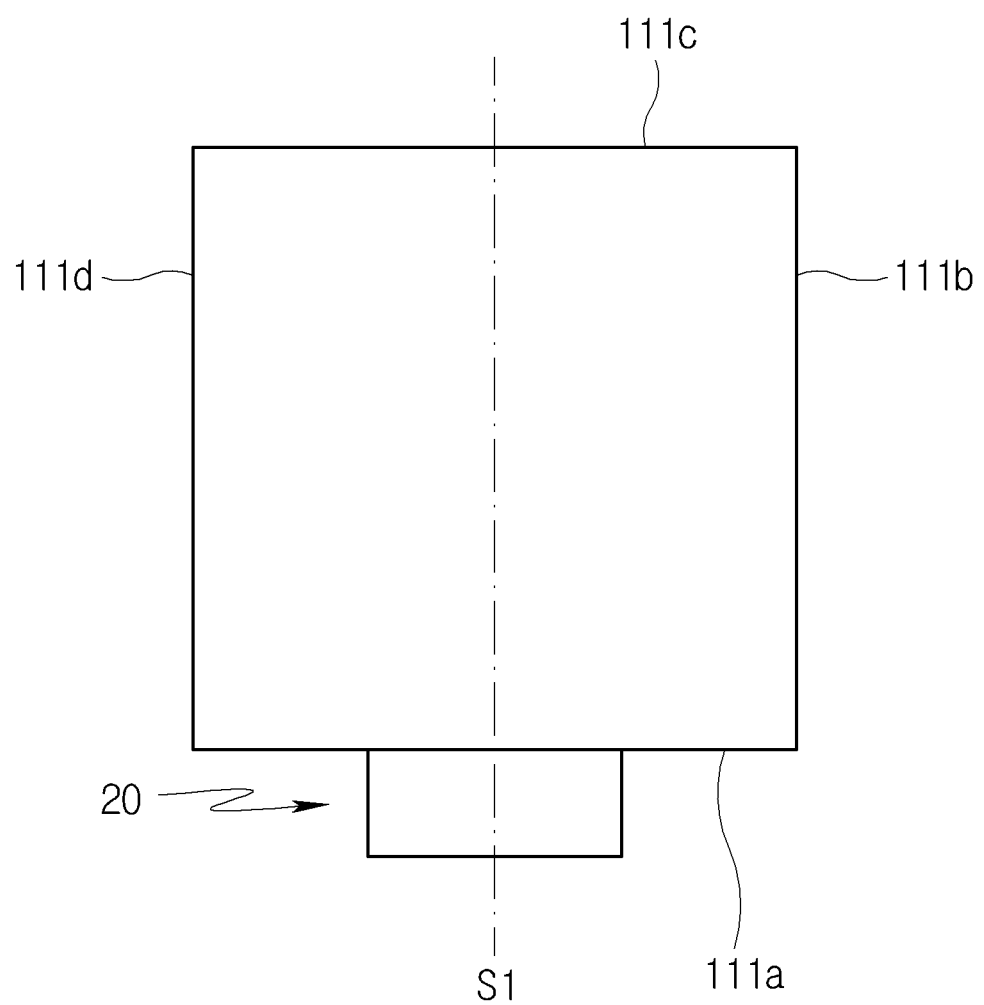
FIG. 4 is a view showing an arrangement relationship between the cleaner and a housing and an outer wall surface arrangement structure of the housing.
Figure 5:
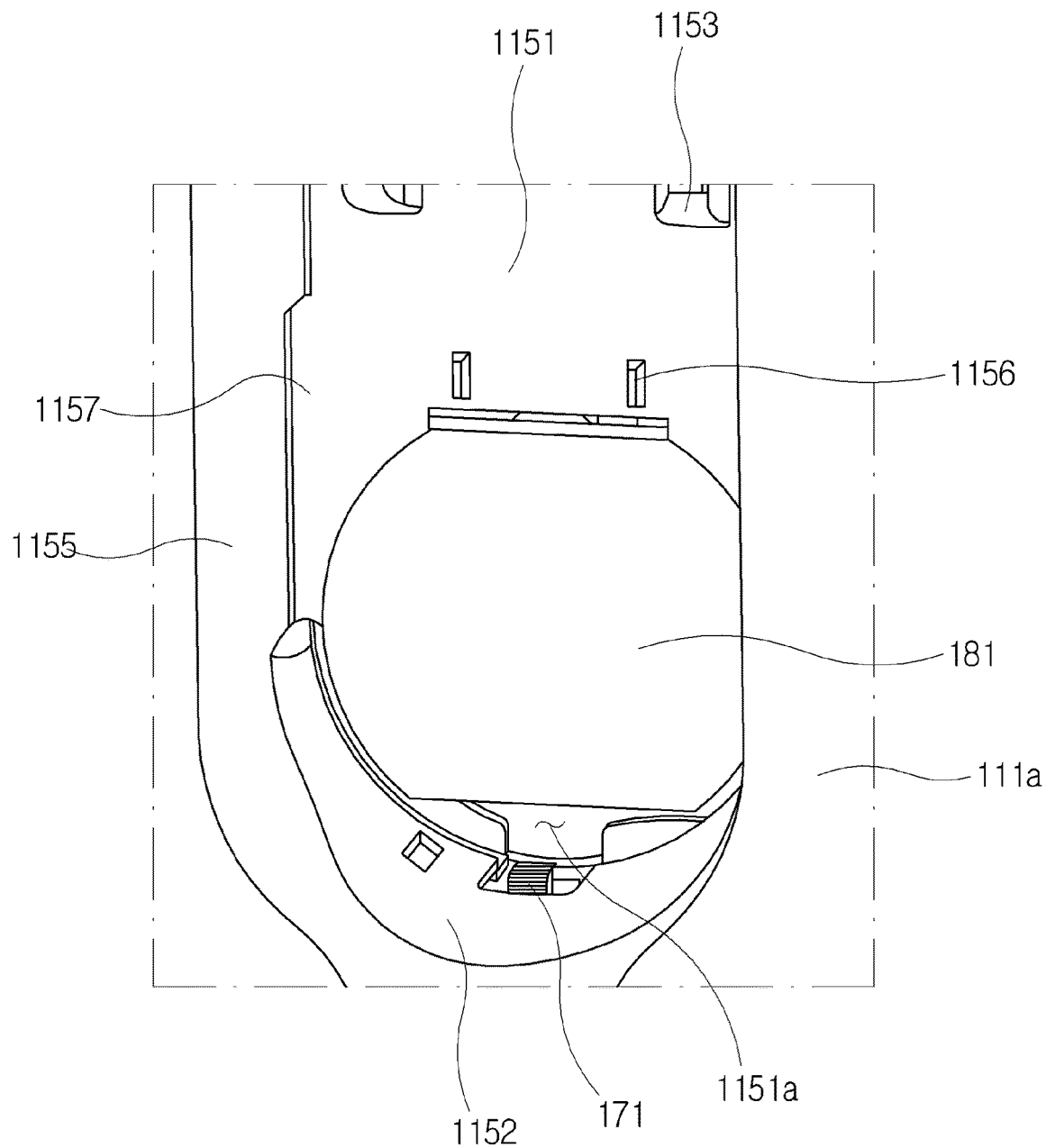
FIG. 5 is an enlarged view of a coupling portion of the cleaner station.

FIG. 1 is a perspective view showing a cleaner system 1 including a cleaner station 10 and a cleaner 20 according to an embodiment of the present disclosure. FIG. 2 is a view showing a shape in which the cleaner 20 is coupled to the cleaner station 10 and a side inside of the cleaner station 10. FIG. 3 is an enlarged view of an opening and closing structure of a dust bin 2160 of the cleaner 20. FIG. 4 is a view showing an arrangement relationship between the cleaner 20 and a housing 110 and an outer wall surface arrangement structure of the housing 110. FIG. 5 is an enlarged view of a coupling portion 115 of the cleaner station 10.

Referring to FIGS. 1 to 5, the cleaner system 1 may include a cleaner station 10 and a cleaner 20.

The cleaner 20 may be coupled to the front of the cleaner station 10. More specifically, the cleaner body 2100 of the cleaner 20 may be coupled to the front of the cleaner station 10.

First, a configuration of the cleaner body 2100 of the cleaner 20 coupled to the cleaner station 10 according to the embodiment of the present disclosure will be briefly described.

Referring to FIG. 2, the cleaner body 2100 may include a suction portion 2110 which provides a flow path through which dust-containing air can flow, a dust separator 2120 which communicates with the suction portion 2110 and separates dust sucked into the inside through the suction portion 2110, a suction motor 2130 which generates a suction force for sucking air, a handle 2140 which is gripped by a user, and a battery housing 2150 which receives a battery therein.

Also, the cleaner body 2100 may further include the dust bin 2160.

Here, the dust bin 2160 may communicate with the dust separator 2120 and may store dust separated by the dust separator 2120.

Referring to FIG. 3, the dust bin 2160 may include a dust bin body 2161, an exhaust cover 2162, and a coupling lever 2163.

The dust bin body 2161 may have a cylindrical shape and have open one side. The air introduced through the suction portion 2110 passes through the dust separator 2120 received in the dust bin body 2161. Here, the dust is collected within the dust bin body 2161, and the air separated from the dust flows to the suction motor 2130 and is discharged to the outside of the cleaner 20. Body protrusions 2161a are formed with the coupling lever 2163 interposed therebetween by that the dust bin body 2161 extends from both sides of the coupling lever 2163 in the longitudinal direction thereof.

The exhaust cover 2162 may be rotatably coupled to the open one side of the dust bin body 2161. More specifically, the exhaust cover 2162 may be coupled to the dust bin body 2161 through the medium of a dust bin hinge 2162a on open one side of the dust bin body 2161. Here, the dust bin hinge 2162a may be disposed on one side close to the battery housing 2150. The exhaust cover 2162 may pivot on the dust bin hinge 2162a as an axis in such a way as to open or close the dust bin body 2161.

Also, the exhaust cover 2162 may include, on one side close to the suction portion 2110, a coupling hook (not shown) which is hook-coupled to the dust bin body 2161. The coupling hook and the dust bin hinge 2162a may be disposed opposite to each other.

The coupling lever 2163 may be provided to move along the outer circumferential surface of the dust box body 261 in the longitudinal direction of the dust bin body 2161 in order to release the hook-coupling between the exhaust cover 2162 and the dust bin body 2161. The coupling lever 2163 may be disposed downward based on a state in which the cleaner 20 is coupled to the cleaner station 10. When an external force is applied to the coupling lever 2163 and the coupling lever 2163 moves in the longitudinal direction of the dust bin body 2161 (a direction in which the hook-coupling is released), the coupling hook provided in a shape extending from the exhaust cover 2162 is elastically deformed and then the hook-coupling between the exhaust cover 2162 and the dust bin body 2161 can be released.

Next, the cleaner station 10 according to the embodiment of the present disclosure will be described.

Referring to FIG. 2, the cleaner station 10 may include the housing 110, a dust collection motor 120, a dust collector 130, and a collector external sterilization unit 160.

The housing 110 is a component to which the cleaner 20 is coupled, and may form an exterior of the cleaner station 10. Specifically, the housing 110 may be formed in a column shape including at least one outer wall surface. For example, the housing 110 may be formed in a shape similar to a quadrangular column.

A space is formed within the housing 110 to receive the dust collection motor 120, the dust collector 130, and the collector external sterilization unit 160.

The housing 110 may include a ground support portion 112. Here, the ground support 112 may be disposed toward the ground. A bottom surface of the ground support portion 112 in contact with the ground can be disposed to be inclined at a predetermined angle to the ground as well as can be placed parallel to the ground. With this configuration, the dust collection motor 120 received within the housing 110 can be stably supported and the overall weight can be balanced even when the cleaner 20 is coupled.

Also, the ground support portion 112 may have a plate shape extending from the bottom surface of the housing 110 in such a manner as to increase an area in contact with the ground in order to prevent the cleaner station 10 from falling over and to maintain balance.

As described above, the housing 110 may include at least one outer wall surface. For example, the housing 110 may include a first outer wall surface 111a on which the coupling portion 115 is formed and may further include a second outer wall surface 111b, a third outer wall surface 111c, and a fourth outer wall surface 111d which are sequentially arranged in a counterclockwise direction in a state where the first outer wall surface 111a is viewed (see FIG. 4).

The housing 110 may be openable such that some of the components received therein (e.g., the dust collector 130) are exposed. For example, when the cleaner station 10 is viewed from the front, a portion of the right side of the first outer wall surface 111a and the second outer wall surface 111b may be integrally opened in the direction of the second outer wall surface 111b. A portion of the left side of the first outer wall surface 111a and the fourth outer wall surface 111d may be integrally opened in the direction of the fourth outer wall surface 111d.

The coupling portion 115 formed on the first outer wall surface 111a may be formed by that the first outer wall surface 111a is recessed into the inside of the housing 110 in such a way as to correspond to a partial shape in the direction in which the dust bin 2160 of the cleaner 20 is disposed. With this configuration, a portion of the cleaner 20 can be coupled to the cleaner station 10 and can be supported by the cleaner station 10.

Hereinafter, the shape of the coupling portion 115 will be described with reference to FIG. 5.

The dust bin 2160 and the battery housing 2150 may be coupled to the coupling portion 115. Referring to FIG. 5, the coupling portion 115 may include a coupling surface 1151. The coupling surface 1151 may be placed parallel to the outer wall surface of the housing 110. For example, the coupling surface 1151 may refer to a surface formed in a shape of a groove concave toward the inside of the cleaner station 100 from the first outer wall surface 111a. That is, the coupling surface 1151 may mean a surface formed to have a step difference with respect to the first outer wall surface 111a.

The cleaner 20 may be coupled to the coupling surface 1151. For example, the coupling surface 1151 may be in contact with the bottom surface of the battery housing 2150 and the dust bin 2160 of the cleaner 20. Here, the bottom surface of the dust bin 2160 may refer to a surface facing the ground when the user uses the cleaner 20 or puts it on the ground.

A dust passage hole 1151a may be formed in the coupling surface 1151 in order to allow external air of the housing 100 to flow into the housing. The dust passing hole 1151a may be formed in a hole shape corresponding to the shape of the dust bin 2160 such that the dust of the dust bin 2160 flows into the dust collector 130. Specifically, the dust passage hole 1151a may be formed to correspond to the shape of the exhaust cover 2162 such that, when the exhaust cover 2162 of the dust bin 2160 is opened, the exhaust cover 2162 can pass through. The dust passage hole 1151a may be formed to communicate with a suction tube 140 to be described later.

The coupling portion 115 may include a dust bin guide surface 1152. The dust bin guide surface 1152 may be disposed on the first outer wall surface 111a. The dust bin guide surface 1152 may be connected to the first outer wall surface 111a. Also, the dust bin guide surface 1152 may be connected to the coupling surface 1151.

The dust bin guide surface 1152 may be formed to have a shape corresponding to the outer surface of the dust bin 2160. Through this, it is possible to provide convenience that allows the cleaner 20 to be coupled to the coupling surface 1151. Also, when the cleaner 20 is coupled to the cleaner station 10, the dust bin 2160 can be supported by dust bin guide surface 1152.

The coupling portion 115 may include a guide protrusion 1153. The guide protrusion 1153 may be disposed on the coupling surface 1151. The guide protrusion 1153 may protrude from the coupling surface 1151. Two guide protrusions 1153 may be disposed to be spaced apart from each other. A distance between the two guide protrusions 1153 spaced apart from each other may correspond to a width of the battery housing 2150 of the cleaner 20. Through this, it is possible to provide convenience that allows the cleaner 20 to be coupled to the coupling surface 1151.

The coupling portion 115 may include a side wall 1155. The side wall 1155 may refer to wall surfaces disposed on both sides of the coupling surface 1151 and may be connected perpendicular to the coupling surface 1151. The side wall 1155 may be connected to the first outer wall surface 111a. Also, the side wall 1155 may be connected to the dust bin guide surface 1152. That is, the side wall 1155 may form a surface connected to the dust bin guide surface 1152. Through this, the cleaner 20 is prevented from shaking left and right, and the cleaner station 10 is able to stably receive the cleaner 20.

The coupling portion 115 may include a coupling sensor 1154. The coupling sensor 1154 may detect whether the cleaner 20 is coupled to the coupling portion 115.

The coupling sensor 1154 may include a contact sensor. For example, the coupling sensor 1154 may include a micro switch. Here, the coupling sensor 1154 may be disposed on the guide protrusion 1153. Therefore, when the battery housing 2150 of the cleaner 20 is coupled between a pair of guide protrusions 1153, the coupling sensor 1154 can detect the cleaner 20 through contact with the battery housing 2150.

Meanwhile, the coupling sensor 1154 may also include a non-contact sensor. For example, the coupling sensor 1154 may include an infrared sensor unit (IR sensor). Here, the coupling sensor 1154 may be disposed on the side wall 1155 and may face the battery housing 2150 or the dust bin 2160 of the cleaner 20.

The coupling sensor 1154 further detects whether or not power is applied to the battery of the cleaner 20 as well as detects the cleaner 20, thereby finally determining whether the cleaner 20 is coupled to the coupling portion 115.

Here, when the battery is electrically coupled to a charging part 1156, it may be determined that power is applied to the battery. The charging part 1156 may be provided on the coupling surface 1151 and can supply power to the cleaner 20 when coupled to the battery.

The coupling portion 115 may further include a fixing member entry and exit hole 1157. The fixing member entry and exit hole 1157 may be formed in the form of a long hole along the side wall 1155 such that a fixing member 191 to be described later can enter and exit. For example, the fixing member entry and exit hole 1157 may be a rectangular hole formed along the side wall 1155. Details of the fixing member 191 will be described later together with a fixing unit 190.

Hereinafter, the dust collection motor 120, the dust collector 130, and the suction tube 140 will be described.

The dust collection motor 120 may be received within the housing 110 and may generate a suction force to suck dust within the dust bin 2160 of the cleaner 20. Accordingly, a flow of air flowing from the top to the bottom of the cleaner station 10 may be formed.

Next, the dust collector 130 may be received within the housing 110 and may be disposed above the dust collection motor 120. When the dust collector 130 is disposed above the dust collection motor 120 and the dust collection motor 120 generates a suction force, the dust sucked from the inside of the dust bin 2160 of the cleaner 20 is collected to the dust collector 130.

The dust collector 130 may be coupled to the housing 110 in an attachable and detachable manner. Accordingly, when the housing 110 is opened, the dust collector 130 may be separated from the housing 110 and discarded, and a new dust collector 130 may be coupled to the housing 110. That is, the dust collector 130 may be defined as a consumable part.

When a suction force is generated by the dust collection motor 120, the volume of the dust collector 130 may increase and dust is received in the dust collector. To this end, the dust collector 130 may be made of a material that transmits air but does not transmit foreign substances such as dust. For example, the dust collector 130 may be made of a non-woven fabric material and may have a hexahedral shape based on an increase in volume.

The cleaner station 10 may further include a suction tube 140.

The suction tube 140 may be received within the housing 110 and may form a space through which air flows such that, when the dust collection motor 120 generates a suction force, the dust within the dust bin 2160 is collected to the dust collector 130.

More specifically, one side end of the suction tube 140 may be coupled to the dust passage hole 1151*a* and the other side end of the suction tube 140 may be coupled to the dust collector 130. Therefore, when the dust collection motor 120 is driven to generate a suction force, a flow of air flowing from one side end to the other side end of the suction tube 140 occurs, and air which includes foreign substances and flows from the inside of the dust bin 2160 of the cleaner 20 moves to the dust collector 130 through the suction tube 140. Also, only the foreign substances remain in the dust collector 130 and the air exits the dust collector 130.

Next, a type in which the cleaner station 10 and the cleaner 20 are coupled will be described.

As described above, the cleaner 20 may be coupled to the front of the housing 110. More specifically, some of the components of the body 2100 of the cleaner 20 are coupled to the coupling portion 115, so that the entire cleaner 20 can be mounted on the cleaner station 10. More specifically, when the cleaner 20 is coupled to the coupling portion 115 of the housing 110, the longitudinal axis of the dust bin 2160 may be arranged parallel to the ground. Also, when the cleaner 20 is coupled to the coupling portion 115 of the housing 110, the longitudinal axis of the dust bin 2160 may be disposed perpendicular to a major axis of the housing 110. Here, the cleaner 20 may be mounted such that the longitudinal axis of the suction portion 2110 of the cleaner 20 is disposed parallel to the major axis of the housing 110 (see FIG. 2).

Meanwhile, the suction tube 140 of the cleaner station 10 may extend within the housing 110 in the up and down direction. Accordingly, the dust present in the dust bin 2160 moves along the dust bin body 2161 in a horizontal direction by the suction force of the dust collection motor 120, and enters the suction tube 140. At this time, the flow direction of the dust changes into a vertical direction. The dust is collected to the dust collector 130 received in the lower inner side of the housing 110.

That is, the dust within the dust bin 2160 of the cleaner 20 may be collected to the dust collector 130 of the cleaner station 10 by the suction force of the dust collection motor 120 and the workings of gravity.

Through this configuration, since the dust in the dust bin can be removed without a separate operation of the user, convenience for users can be provided. In addition, it is possible to remove the inconvenience for the user to empty the dust bin each time. Also, the dust can be prevented from scattering during the emptying of the dust bin.

The cleaner station 10 according to the embodiment of the present disclosure may further include a dust collector housing 135 which is received within the housing 110 and has an interior space to which the dust collector 130 is coupled.

Figure 6:
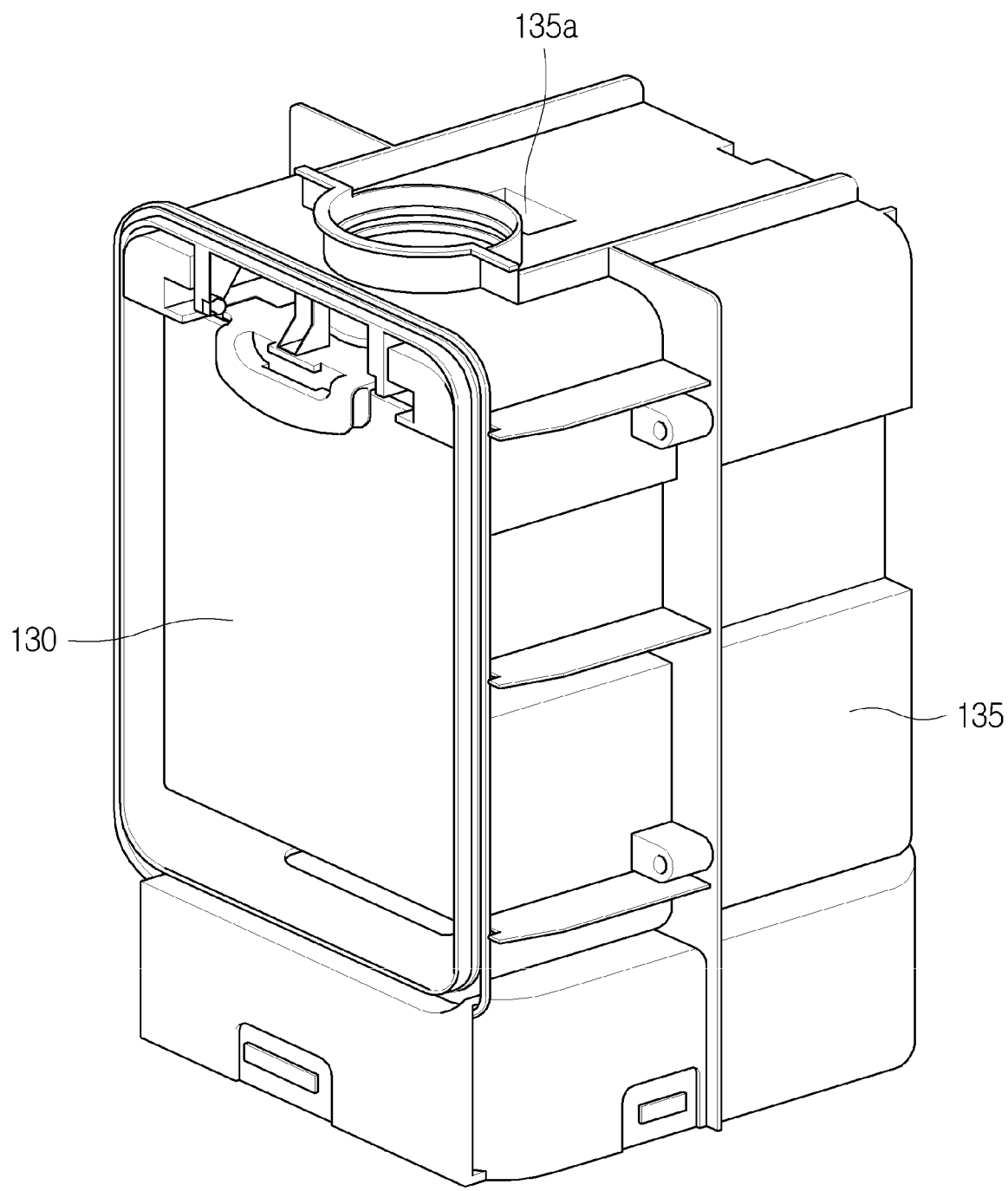
FIG. 6 is a view showing a state in which a dust collector is received in and coupled to a dust collector housing.
Figure 7:
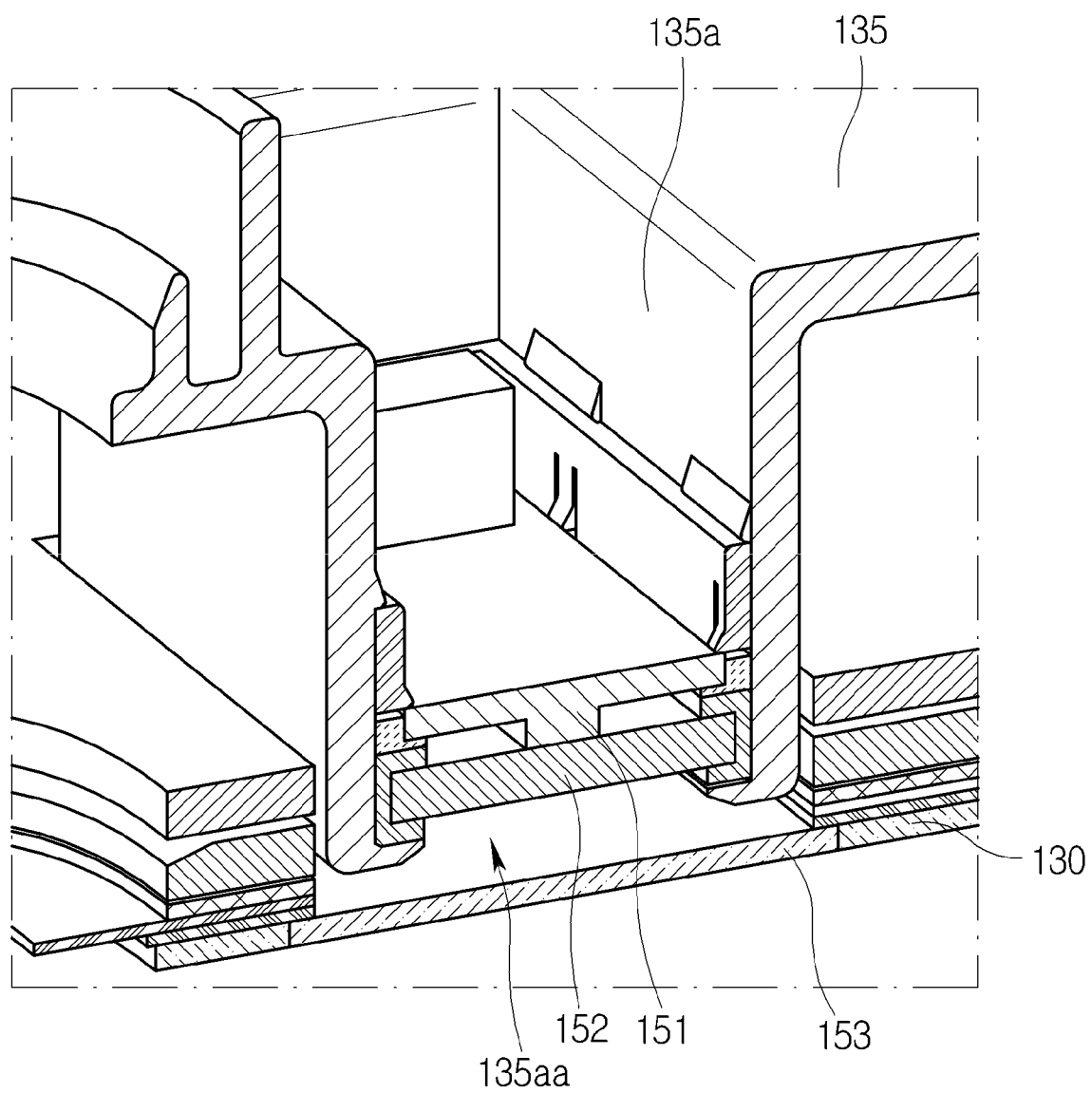
FIG. 7 is an enlarged view of a receiving recess provided in the dust collector housing.

FIG. 6 is a view showing a state in which the dust collector 130 is received in and coupled to the dust collector housing 135. FIG. 7 is an enlarged view of a receiving recess 135*a* provided in the dust collector housing 135.

The cleaner station 10 according to the embodiment of the present disclosure may further include a collector internal sterilization unit 150 disposed in the dust collector housing 135.

Referring to FIGS. 6 and 7, the receiving recess 135*a* may be provided in the dust collector housing 135 in order to receive the collector internal sterilization unit 150. Here, the collector internal sterilization unit 150 may include a collector sterilizing LED 151, a protection panel 152, and a transmissive panel 153 as components for sterilizing the inside of the dust collector 130.

The receiving recess 135*a* may be formed such that a portion of an outer upper surface of the dust collector housing 135 is bent toward an interior space of the dust collector housing 135. Also, an opening 135*aa* which penetrates toward the interior space of the dust collector housing 135 may be formed below the receiving recess 135*a* such that sterilization light emitted from the collector internal sterilization unit 150 can transmit.

The LED collector sterilizing LED 151 is coupled to the inside of the receiving recess 135a and may be disposed to emit sterilization light toward the dust collector 130. For example, the LED collector sterilizing LED 151 may emit ultraviolet light as sterilization light. The ultraviolet light damages DNA double helix of microorganisms and inhibits the growth of microorganisms. Therefore, when the ultraviolet light is irradiated, foreign substances including microorganisms such as bacteria can be sterilized. Here, the LED collector sterilizing LED 151 may be formed of one or more light emitting diodes.

The protection panel 152 may be coupled to the inside of the receiving recess 135a so as to protect the LED collector sterilizing LED 151 from an external force, and may be disposed below the LED collector sterilizing LED 151 in such a manner as to be disposed apart from the LED collector sterilizing LED 151 by a predetermined distance from the LED collector sterilizing LED 151. Here, the protection panel 152 may be made of a material that maximizes the transmittance of the LED collector sterilizing LED 151. For example, the protection panel 152 may be made of quartz. It is known that quartz does not interfere with the transmission of ultraviolet light.

As such, the LED collector sterilizing LED 151 and the protection panel 152 are received in the receiving recess 135a and emit sterilization light toward the inside of the dust collector 130 through the opening 135aa of the receiving recess 135a. With this configuration, the growth of microorganisms is inhibited inside the dust collector 130, and the inside of the dust collector 130 can be hygienically managed.

The transmissive panel 153 may be made of a material through which sterilization light emitted from the collector sterilizing LED 151 can transmit toward the inside of the dust collector 130. For example, the transmissive panel 153 may be made of a poly methyl methacrylate (PMMA) material.

The transmissive panel 153 may be coupled to a top surface of the dust collector 130. Also, when the dust collector 130 is coupled to the dust collector housing 135, the transmissive panel 153 may be disposed at a position facing the protection panel 152. Meanwhile, the transmissive panel 153 is coupled to the dust collector 130, so that the transmissive panel 153, together with the dust collector 130, can be defined as a replaceable consumable.

Through this configuration, since the transmissive panel 153 to which the dust within the dust collector 130 scatters and sticks can be periodically replaced with a new product, it is possible to prevent the transmittance of the transmissive panel 153 from decreasing and to maintain the sterilization performance of the dust collector 130 by the collector internal sterilization unit 150 such that the sterilization performance is not degraded.

Meanwhile, the collector internal sterilization unit 150 may be disposed at the center of a top surface of the dust collector housing 135. More specifically, the collector internal sterilization unit 150 may be disposed such that an optical axis of ultraviolet light emitted from the LED collector sterilizing LED 151 passes through the center of the top surface of the dust collector housing 135.

Through this configuration, there is an advantage of minimizing a dead-zone that is an area where sterilizing power of the sterilization light emitted from the LED collector sterilizing LED 151 does not reach.

Next, the collector external sterilization unit 160 may be received within the housing 110 and may be provided to cause a sterilization reaction on foreign substances such as bacteria, mold, etc., present outside the dust collector 130. When the cleaner station 10 is used, the collector external sterilization unit 160 may provide sterilizing power to foreign substances that may exist in various areas except for the inside of the dust collector 130. A detailed embodiment of the collector external sterilization unit 160 will be described later with reference to FIGS. 11 to 18.

The cleaner station 10 according to the embodiment of the present disclosure may further include a cover opening unit 170.

Figure 8:
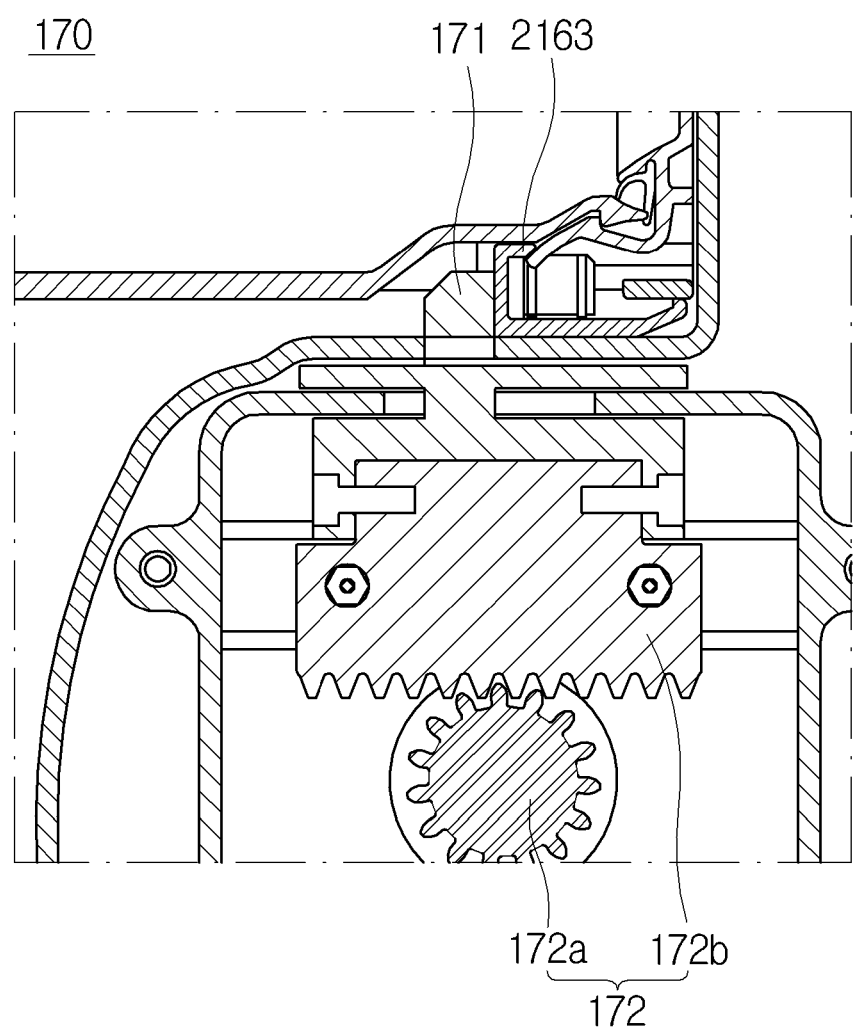
FIG. 8 is an enlarged view of a cover opening unit of the cleaner station.

FIG. 8 is an enlarged view of the cover opening unit 170 of the cleaner station 10.

Referring to FIGS. 2 and 8, the cover opening unit 170 is disposed within the housing 110 and below the coupling portion 115 to open the exhaust cover 2162 of the cleaner 20. The cover opening unit 170 may include a push protrusion 171, a cover opening gear 172, and a cover opening motor (not shown).

The push protrusion 171 may be disposed at a position where the coupling lever 2163 can be pressed when the cleaner 20 is coupled. The push protrusion 171 may perform a linear reciprocating motion in such a way as to press the coupling lever 2163. Specifically, the push protrusion 171 may be disposed on the dust bin guide surface 1152. A protrusion movement hole may be formed on the dust bin guide surface 1152, and the push protrusion 171 may pass through the protrusion movement hole and be exposed to the outside. The push protrusion 171 may be coupled to the cover opening gear 172 and may move together by the movement of the cover opening gear 172.

The cover opening motor may provide the cover opening gear 172 with power for moving the push protrusion 171.

The cover opening gear 172 may be coupled to the cover opening motor and may move the push protrusion 171 by using the power of the cover opening motor. More specifically, the cover opening gear 172 may include a first cover opening gear 172a and a second cover opening gear 172b. The first cover opening gear 172a receives rotation power from a shaft of the cover opening motor. The second cover opening gear 172b meshes with the first cover opening gear 172a and transmits the linear reciprocating motion to the push protrusion 171.

Here, the first cover opening gear 172a may be composed of a pinion gear, and the second cover opening gear 172b may be composed of a rack gear.

In other words, when the body 2100 of the cleaner 20 is fixed to the coupling portion 115, the cover opening motor moves the push protrusion 171 through the cover opening gear 172, thereby separating the exhaust cover 2162 from the dust bin body 2161.

The cleaner station 10 according to the embodiment of the present disclosure may further include a door unit 180.

Figure 9:
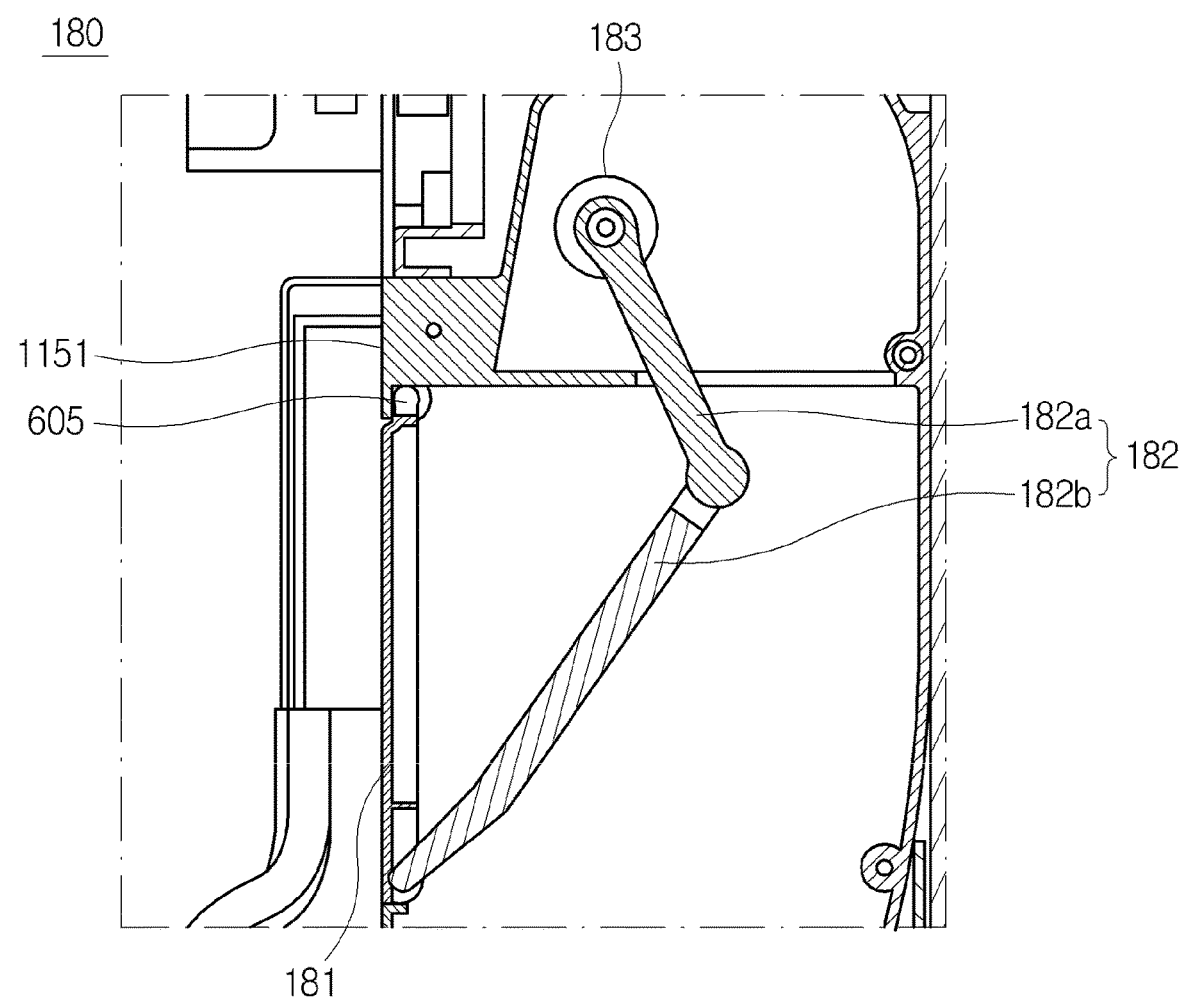
FIG. 9 is an enlarged view of a door unit of the cleaner station.

FIG. 9 is an enlarged view of the door unit 180 of the cleaner station 10.

Referring to FIG. 9, the door unit 180 is disposed from the coupling surface 1151 to the rear of the coupling surface 1151 and may include a door 181, a door arm 182, and a door motor 183.

The door 181 may be coupled to the coupling surface 1151 by a hinge 185, and may rotate about the hinge 185 to open and close the inside and outside of the housing 110.

More specifically, when the door arm 182 pulls the door 181 in a state where the door 181 closes the inside of the housing 110, the door 181 may moves rotationally toward the inside of the housing 110 of the cleaner station 10. Meanwhile, when the door arm 182 pushes the door 181, the door 181 may move rotationally toward the outside of the cleaner station 10.

The door motor 183 may provide power for rotating the door 181 to the door arm 182. Specifically, the door motor 183 may rotate the door arm 182 in the forward or reverse direction. Here, the forward direction may mean a direction in which the door arm 182 pulls the door 181 toward the inside of the housing 110. Also, the reverse direction may mean a direction in which the door arm 182 pushes the door 181 toward the outside of the housing 110.

The door arm 182 may connect the door 181 and the door motor 183 and may open and close the door 181 by using the power generated by the door motor 183.

For example, the door arm 182 may include a first door arm 182a and a second door arm 182b. One side end of the first door arm 182a may be coupled to the door motor 183. The first door arm 182a may rotate by the power of the door motor 183. The other side end of the first door arm 182a may be rotatably coupled to the second door arm 182b. The first door arm 182a may transmit the power transmitted from the door motor 183 to the second door arm 182b. One side end of the second door arm 182b may be coupled to the first door arm 182a. The other side end of the second door arm 182b may be coupled to the door 181. The second door arm 182b may push or pull the door 181.

The cleaner station 10 according to the embodiment of the present disclosure may further include the fixing unit 190.

Figure 10:
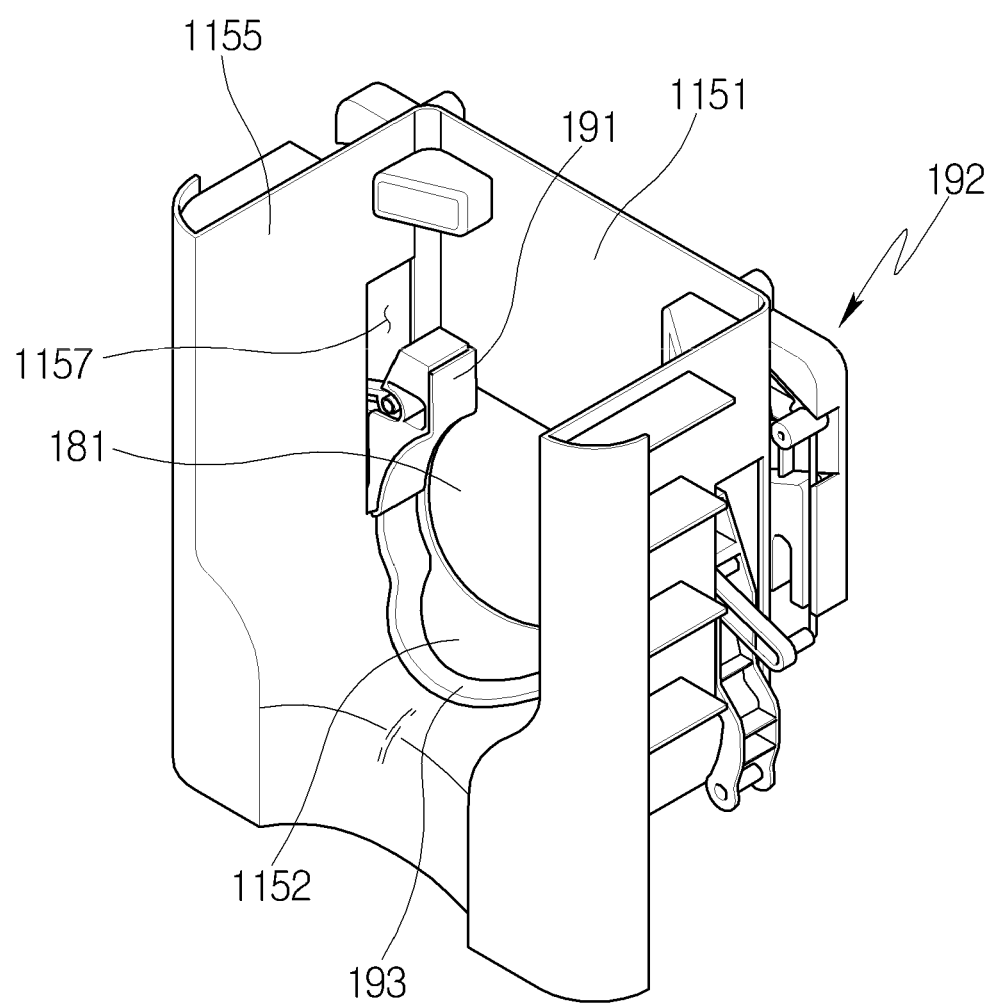
FIG. 10 is a view showing a state in which a fixing unit of the cleaner station is coupled to the coupling portion.

FIG. 10 is a view showing a state in which the fixing unit 190 of the cleaner station 10 is coupled to the coupling portion 115.

Referring to FIG. 10, a portion of the fixing unit 190 may be disposed on the side wall 1155. Also, a portion of the fixing unit 190 may be disposed behind the coupling surface 1151.

The fixing unit 190 may fix the cleaner 20 coupled to the coupling surface 1151. More specifically, the fixing unit 190 may fix the battery housing 2150 and the dust bin 2160 of the cleaner 20 coupled to the coupling surface 1151.

The fixing unit 190 may include the fixing member 191, a fixing portion motor 192, and a fixed sealer 193.

The fixing member 191 may receive power from the fixing portion motor 192 and may perform a reciprocating movement from the inside of the side wall 1155 of the coupling portion 115 toward the dust bin 2160. The fixing member 191 may enter and exit the side wall 1155 through the fixing member entry and exit hole 1157. The upper portion of the fixing member 191 may be formed in a shape corresponding to the shape of the battery housing 2150, and the lower portion of the fixing member 191 may be formed in a shape corresponding to the shape of the dust bin body 2161.

Through this configuration, when the fixing member 191 rotates to surround the dust bin 2160 and the battery housing 2150, it is possible to prevent a space from being formed between the dust bin 2160 and the fixing member 191 and between the battery housing 2150 and the fixing member 191, and it is possible to prevent the dust within the dust bin 2160 from scattering to the outside of the cleaner station 10 when dust is sucked by the dust collection motor 120.

The fixing portion motor 192 may provide power for moving the fixing member 191. Specifically, the fixing member 191 may be moved by the fixing portion motor 192 from the inside of the side wall 1155 in a direction of pressing the dust bin 2160, so that the cleaner 20 can be fixed to the cleaner station 10. Alternatively, the fixing member 191 may move from a position where the dust bin 2160 is pressed to the inside of the side wall 1155, so that the state in which the cleaner 20 is fixed to the cleaner station 10 can be released.

The fixed sealer 193 may be disposed on the dust bin guide surface 1152 to seal the dust bin 2160 when the cleaner 20 is coupled. Through this configuration, when the dust bin 2160 of the cleaner 20 is coupled, the fixed sealer 193 can be pressed by the weight of the cleaner 20, and the dust bin 2160 and the dust bin guide surface 1152 can be sealed such that the flow of air does not leak.

Hereinafter, various embodiments of the collector external sterilization unit 160 will be described with reference to FIGS. 11 to 14.

Figure 11:
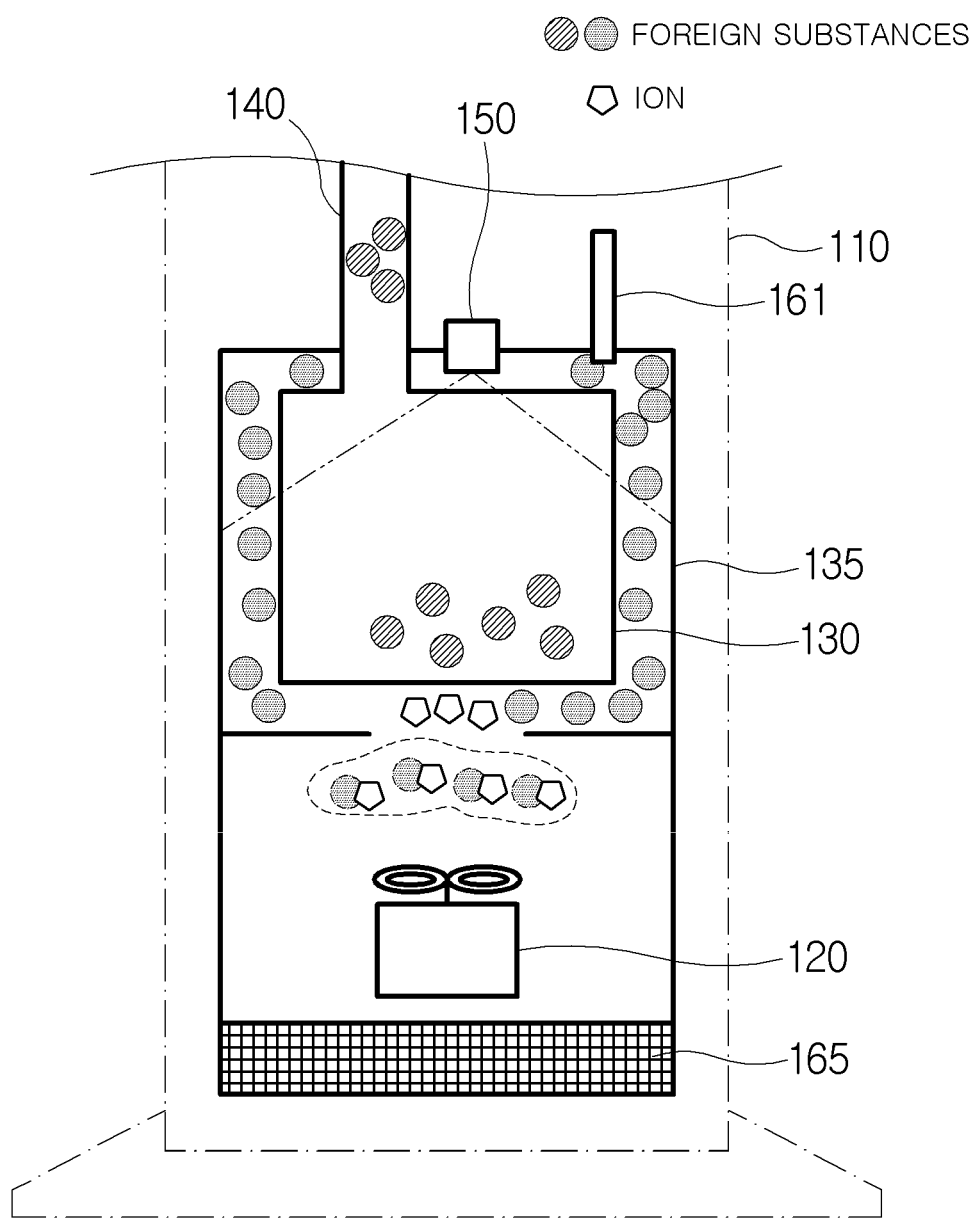
FIG. 11 is a mimetic diagram showing the arrangement of an ionizer as an embodiment of a collector external sterilization unit.

FIG. 11 is a mimetic diagram showing the arrangement of an ionizer 161 as an embodiment of the collector external sterilization unit 160.

Referring to FIG. 11, the collector external sterilization unit 160 may include the ionizer 161 configured to generate ions. The ionizer 161 may be disposed within the housing 110. Also, the ions generated by the ionizer 161 may be composed of anions and cations, and the cations and anions remove or sterilize various harmful substances contained in the air, for example, harmful germs and allergens such as bacteria, viruses, and dust mites, and inhibit the activity of the harmful germs, bacteria, viruses, etc.

On the other hand, the cleaner station 10 according to the embodiment of the present disclosure may further include a HEPA filter 165. The HEPA filter 165 is received within the housing 110, is disposed below the dust collection motor 120, and filters foreign substances from the air sucked by the dust collection motor 120. The HEPA filter 165 may serve to finally filter out foreign substances before the air sucked by the dust collection motor 120 is discharged to the outside of the housing 110.

Here, the ionizer 161 may be disposed above the HEPA filter 165. Since the ionizer 161 is disposed above the HEPA filter 165 within the housing 110, the air containing foreign substances may pass through the HEPA filter 165 and may be combined with the ions released from the ionizer 161 before the air is discharged to the outside of the housing 110. With this configuration, foreign substances such as bacteria can be sterilized before the air is discharged through the HEPA filter 165, and odors of the air which is exhausted to the outside of the housing 110 is reduced.

Also, the ionizer 161 may be coupled to the dust collector housing 135. More specifically, the ionizer 161 is coupled to the dust collector housing 135, and an entrance of the ionizer 161 that generates ions may be disposed between the dust collector 130 and the dust collector housing 135. That is, the ionizer 161 may be provided to generate ions in a space between the outer wall of the dust collector 130 and the inner wall of the dust collector housing 135.

With this configuration, the ions generated by the ionizer 161 may flow while surrounding the outer wall surface of the dust collector 130, and may cause a sterilization reaction on foreign substances such as bacteria present outside the dust collector 130. Accordingly, bacterial growth that may occur on the outer surface of the dust collector 130 can be inhibited, and hygiene convenience can be provided when the user takes out the dust collector 130 from the housing 110 and replaces.

Meanwhile, it is preferable that the ionizer 161 should be disposed on the top surface of the dust collector housing 135. With this configuration, a flow path for the ions generated by the ionizer 161 to pass through the HEPA filter 165 by the workings of gravity and are exhausted may be longer than a flow path of the ions in a configuration in which the ionizer 161 is disposed on the side surface or the bottom surface of the dust collector housing 135. Accordingly, the ions are able to flow within the cleaner station 10 for a longer period of time, and the sterilization reaction time on the outer surface of the dust collector 130 can be maintained relatively long.

The ionizer 161 may be controlled by a controller 400 to be described later. More specifically, when the user sets an ion generation mode by external operations, the controller 400 may control the ionizer 161 to generate ions.

Alternatively, the ionizer 161 can be controlled by the controller 400 such that the ionizer 161 is immediately operated after the suction of dust within the dust bin 2160 is completed without user's external operations.

Figure 12:
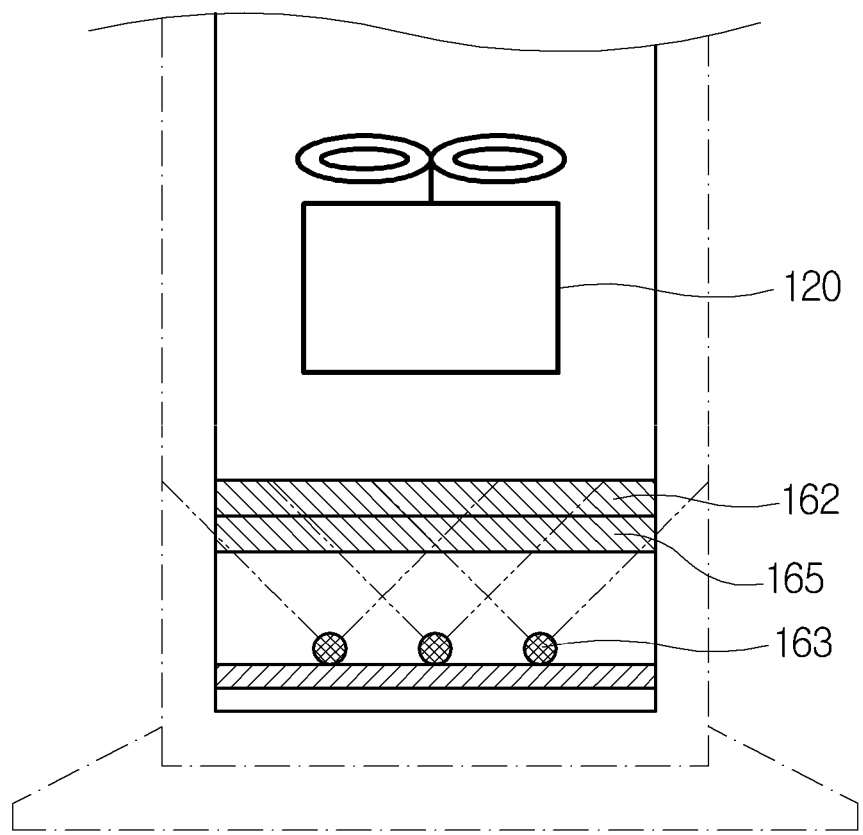
FIG. 12 is a mimetic diagram showing the arrangement of a photocatalyst filter and a photocatalyst LED as another embodiment of the collector external sterilization unit.

FIG. 12 is a mimetic diagram showing the arrangement of a photocatalyst filter 162 and a photocatalyst LED 163 as another embodiment of the collector external sterilization unit 160.

Referring to FIG. 12, the collector external sterilization unit 160 may include the photocatalyst filter 162 and the photocatalyst LED 163.

The photocatalyst filter 162 is received within the housing 110 and may include a photocatalyst that responds to visible light. The photocatalyst filter 162 may be coupled to the top of the HEPA filter 165. The photocatalyst filter 162 may be formed by combining activated carbon and a photocatalyst in a predetermined ratio. Alternatively, the photocatalyst filter may be formed in a form in which a photocatalyst is coated on an activated carbon pellet.

The photocatalyst, as is known, refers to a material that functions as a catalyst to promote a chemical reaction as the chemical state of the surface thereof is changed when light such as visible light or ultraviolet light is irradiated. When light is irradiated on the surface of the photocatalyst, radical materials such as hydroxyl radical, superoxide anions, etc., are generated, and the thus generated radical materials perform functions of removing, sterilizing, etc., harmful substances. Representative examples used as the photocatalyst include titanium dioxide, tin oxide, iron oxide, tungsten oxide, zinc oxide, cadmium sulfide, etc.

Meanwhile, in the embodiment of the present disclosure, the photocatalyst included in the photocatalyst filter 162 may be capable of photoactivation in visible light. For example, the photocatalyst may be tungsten oxide.

With this configuration, air containing foreign substances may react with the photocatalyst before being exhausted through the HEPA filter 165. That is, air exhausted through the HEPA filter 165 is sterilized by a photocatalyst reaction, thereby reducing odors.

The photocatalyst LED 163 may be disposed below the photocatalyst filter 162. More specifically, the photocatalyst LED 163 may be disposed below the HEPA filter 165 to which the photocatalyst filter 162 is coupled, and may be provided to emit visible light in a direction in which the photocatalyst filter 162 is disposed, that is, toward an upward direction within the housing 110. Meanwhile, the photocatalyst LED 163 may be provided to generally emit visible light. The photocatalyst LED 163 may be composed of one or more light emitting diodes.

With this configuration, the photocatalyst included in the photocatalyst filter 162 is activated by receiving visible light from the photocatalyst LED 163 to perform the photocatalyst reaction with foreign substances and to sterilize the foreign substances. Also, since the photocatalyst only serves as a catalyst and is regenerated after the completion of the photocatalyst reaction, the sterilizing power can be maintained semi-permanently.

Figure 13:
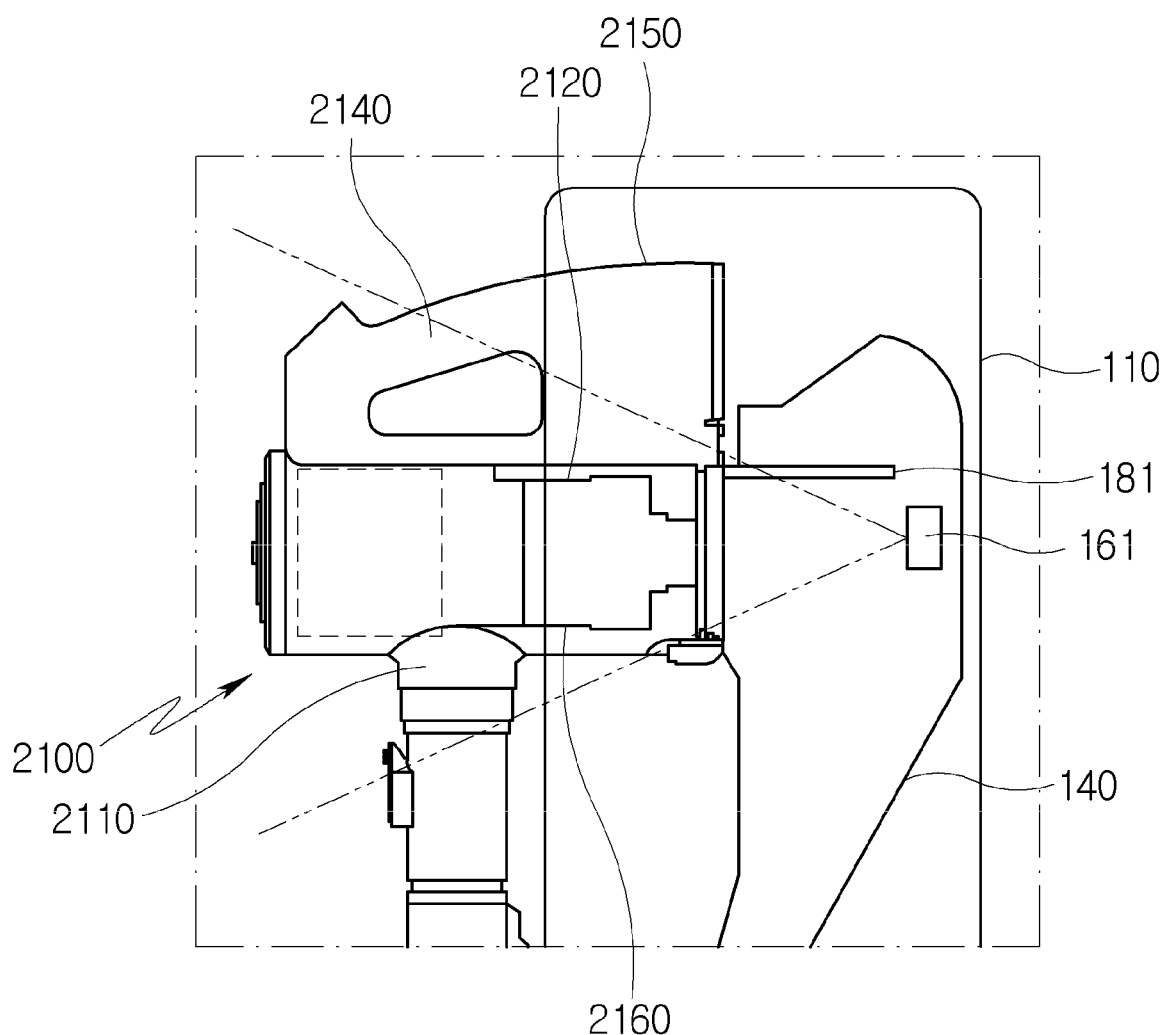
FIG. 13 is a mimetic diagram showing the arrangement of a dust bin sterilization LED as further another embodiment of the collector external sterilization unit.
Figure 14:
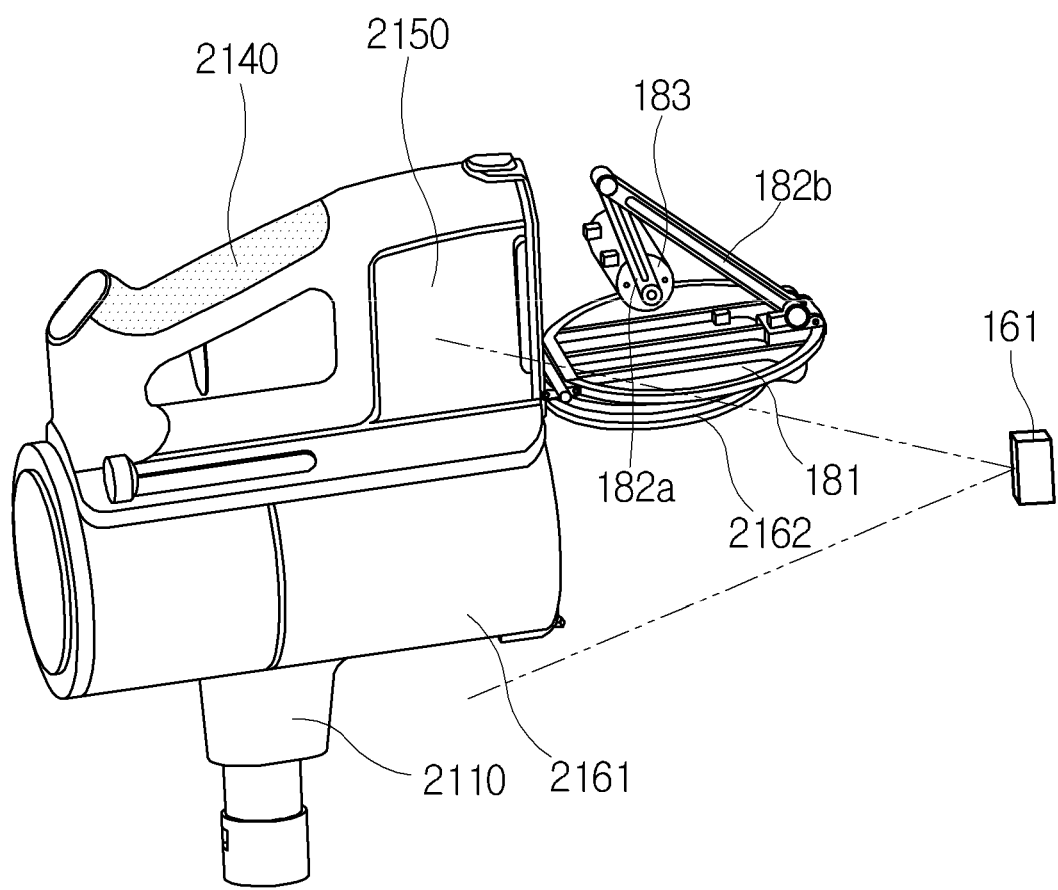
FIG. 14 is a perspective view showing the positional relationship of the dust bin, the door unit, and the dust bin sterilization LED.

FIG. 13 is a mimetic diagram showing the arrangement of a dust bin sterilization LED 164 as further another embodiment of the collector external sterilization unit 160. FIG. 14 is a perspective view showing the positional relationship of the dust bin 2160, the door unit 180, and the dust bin sterilization LED 164.

Referring to FIG. 13, the collector external sterilization unit 160 may include the dust bin sterilization LED 164 which is disposed in the suction tube 140 and emits ultraviolet light.

When the dust bin 2160 of the cleaner 20 is coupled to the housing 110, the dust bin sterilization LED 164 may be disposed at a position facing the bottom surface of the dust bin 2160. More specifically, the bottom surface of the dust bin 2160 means a direction in which the cleaner 20 is disposed to face the coupling surface 1151 when the cleaner 20 is coupled to the coupling portion 115 of the cleaner station 10. The dust bin sterilization LED 164 may be composed of one or more light emitting diodes.

Also, the dust bin sterilization LED 164 may be provided to emit ultraviolet light toward the bottom of the dust bin 2160. With this configuration, after the process of collecting dust in the dust bin 2160 of the cleaner 20 is completed, the inside of the dust bin 2160 can be sterilized while the cleaner 20 is coupled to the cleaner station 10, thereby providing users with convenience for hygiene management of the cleaner.

It is preferable that, in a state where the dust bin 2160 is coupled to the coupling portion 115 of the cleaner station 10, the dust bin sterilization LED 164 is disposed such that the longitudinal axis of the dust bin 2160 coincides with the center of an optical axis of the ultraviolet light emitted from the dust bin sterilization LED 164. With this configuration, the sterilizing power of the ultraviolet light on foreign substances can be maximized by ensuring that there is no portion of the dust bin 2160 where the ultraviolet light does not reach.

Meanwhile, the dust bin sterilization LED 640 may emit ultraviolet light toward the bottom of the dust bin in a state where the exhaust cover and the door are open (see FIG. 14).

The dust bin sterilization LED 164 may be controlled by the controller 400 to be described later. More specifically, when the user sets a dust bin sterilization mode by external operations, the controller 400 may control the dust bin sterilization LED 164 to emit ultraviolet light.

More specifically, when the dust bin sterilization mode is set, the controller 400 may control to open the door 181 and the exhaust cover 2162 of the dust bin 2160, and may control the dust bin sterilization LED 164 to emit ultraviolet light. Also, here, the controller 400 may control the dust collection motor 120 not to operate even when the door 181 and the exhaust cover 2162 of the dust bin 2160 are open.

A step-by-step configuration of a detailed method for controlling the cleaner station 10 when the dust bin sterilization mode is set will be described later with reference to FIGS. 16 and 17.

Figure 15:
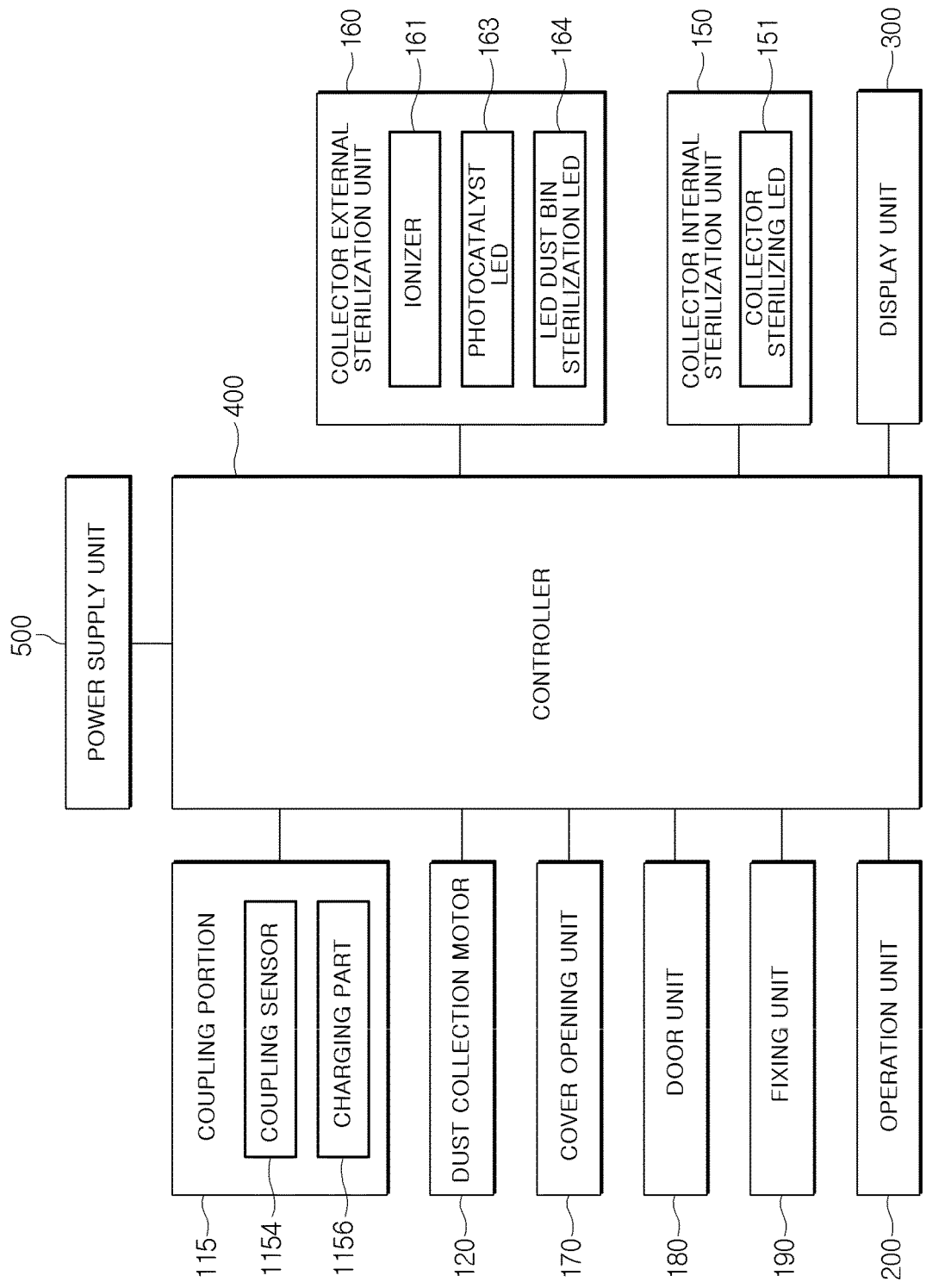
FIG. 15 is a block diagram of the cleaner station according to the embodiment of the present disclosure.

FIG. 15 is a block diagram of the cleaner station 10 according to the embodiment of the present disclosure.

The cleaner station 10 according to the embodiment of the present disclosure may further include an operation unit 200, a display unit 300, and the controller 400. Here, the controller 400 may control the operations of the coupling portion 115, the dust collection motor 120, the collector internal sterilization unit 150, the collector external sterilization unit 160, the cover opening unit 170, the door unit 180, the fixing unit 190, the operation unit 200, and the display unit 300.

The operation unit 200 may be composed of a conventional button, a conventional touch panel, or the like, and may be configured such that the user can input a command for the operation of the cleaner station 10 by touching or pressing by a predetermined force.

The operation unit 200 may be disposed in the housing 110. For example, the operation unit 200, together with the display unit 300, is disposed on the surface of the first outer wall surface 111a of the housing 110 and is configured to turn on or off various operations related to the cleaner station 10 when the operation unit is pressed by the user.

The operation unit 200 may receive a command for operating the collector external sterilization unit 160 through the operation by the user. For example, the user may input a command for setting the dust bin sterilization mode through the operation unit 200 in order to operate the dust bin sterilization LED 164. As another example, the user may input a command for setting the ion generation mode through the operation unit 200 in order to operate the ionizer 161.

The above-described command for setting the dust bin sterilization mode and/or ion generation mode may be input as a control signal corresponding to each of the modes through a button or a touch pad provided in the operation unit 200 and may be transmitted to the controller 400.

The display unit 300 may be disposed in the housing 110. For example, the display unit 300 may be disposed on a top surface 113 of the housing 110. Alternatively, as another example, the display unit 300, together with the operation unit 200, may be disposed on the first outer wall surface 111a of the housing 110. Here, the display unit 300 may be disposed on both sides with the coupling portion 115 interposed therebetween, so that various types of information on the cleaner 20 may be displayed in a distributed manner.

The display unit 300 may include at least one of a display means capable of outputting characters and/or figures, and a speaker capable of outputting voice signals and sounds. The user can easily identify, through the information output through the display unit 300, operations currently in progress, a mode set with relation to a sterilization function, the charge state of the cleaner, how much a dust bag is filled, and the like.

Here, the display means may be composed of any one of a light emitting diode (LED), a liquid crystal display (LCD), a plasma display panel, and an organic light emitting diode (OLED).

The controller 400 may be composed of a printed circuit board and devices mounted on the printed circuit board.

When the cleaner 10 is coupled to the coupling portion 115, the coupling sensor 1154 may detect the coupling and transmit a signal to the controller 400. Here, the controller 400 may receive the signal of the coupling sensor 1154 and determine that the cleaner 20 is coupled.

Also, when not only the signal from the coupling sensor 1154 is received but also the charging part 1156 and the battery of the cleaner 20 are coupled to supply power to the battery of the cleaner 20, the controller 400 may determine that the cleaner 20 is coupled to the coupling portion 115.

If determining that the cleaner 20 is coupled to the coupling portion 115, the controller 400 may operate the fixing unit 190 to fix the cleaner 20 to the coupling portion. More specifically, when the controller 400 transmits a signal for driving the fixing portion motor 192 to the fixing portion motor 192, the fixing portion motor 192 is driven and the fixing member 191 moves from the inside of the side wall 1155 toward the dust bin 2160, so that the dust bin body 2161 and the battery housing 2150 can be fixed to the coupling portion 115.

After the cleaner 20 is fixed to the coupling portion 115, the controller 400 may open the door 181 of the cleaner station 10 by operating the door unit 180. More specifically, when the controller 400 transmits a signal for driving the door motor 183 to the door motor 183, the door motor 183 is driven and the door arm 182 moves in a direction of opening the door 181. Then, the door 181 can be opened.

The controller 400 may open the exhaust cover 2162 of the cleaner 20 by operating the cover opening unit 170 after the door 181 is opened. More specifically, when the controller 400 transmits a signal for driving the cover opening motor to the cover opening motor, the cover opening motor is driven, and the cover opening gear 172 connected to the cover opening motor may move the push protrusion 171 in a straight line in a direction of pressing the coupling lever 2163 of the dust bin 2160. When the push protrusion 171 presses the coupling lever 2163 of the exhaust cover 2162, the exhaust cover 2162 is opened so that the inside of the dust bin 2160 and the suction tube 140 may communicate with each other.

After both the door 181 and the exhaust cover 2162 are opened and the inside of the dust bin 2160 communicates with the suction tube 140, the controller 400 drives the dust collection motor 120 to generate a suction force that sucks the dust within the dust bin 2160. More specifically, when the controller 400 transmits a signal for driving the dust collection motor 120 to the dust collection motor 120, the dust collection motor 120 is driven to generate a suction force which is directed from the top to the bottom of the suction tube 140. When the suction force is generated in the suction tube 140, the dust present within the dust bin 2160 can move through the suction tube 140 and is collected to the dust collector 130 coupled to the end of the suction tube 140.

The controller 400 may operate the display unit 300 to display various types of information on the cleaner 20. The display unit may display an empty state of the dust bin, the charge state, etc.

The controller 400 may operate the LED collector sterilizing LED 151 to emit ultraviolet light. More specifically, when the dust collection motor 120 completes sucking the dust from the inside the dust bin 2160 and the driving is terminated, the controller 400 may drive the door motor 183 to close the door 181. Here, as the door 181 is closed, the exhaust cover 2162 of the dust bin 2160 is pressed, and when the door 181 is completely closed, the dust bin body 2161 and the exhaust cover 2162 are coupled to also close the exhaust cover 2162. When the exhaust cover 2162 is closed, the controller 400 can operate the collector sterilizing LED 151 to emit ultraviolet light into the dust collector 130 even without a user's input through the operation unit 200. Through this, the foreign substances present within the dust collector 130 and the ultraviolet light cause a sterilization reaction to remove the foreign substances.

The controller 400 may control to operate the ionizer 161 to generate ions. More specifically, when the user inputs a command for setting the ion generation mode through the operation unit 200, a control signal corresponding to an ion setting mode is transmitted to the controller 400. When receiving the control signal corresponding to the ion setting mode, the controller 400 may control to operate the ionizer 161 to generate ions into the space between the outer wall of the dust collector 130 and the inner wall of the dust collector housing 135. Through this, the foreign substances present outside the dust collector 130 and the ions cause a sterilization reaction to remove the foreign substances.

Meanwhile, when the operation of the dust collection motor 120 is completed, the controller 400 may control the ionizer 161 to generate ions. More specifically, when the dust collection motor 120 completes sucking the dust from the inside of the dust bin 2160 and the driving is terminated, the controller 400 may drive the door motor 183 to close the door 181. Here, as the door 181 is closed, the exhaust cover 2162 of the dust bin 2160 is pressed, and when the door 181 is completely closed, the dust bin body 2161 and the exhaust cover 2162 are coupled to also close the exhaust cover 2162. When the exhaust cover 2162 is closed, the controller 400 may control to operate the ionizer 161 to generate ions into the space between the outer wall of the dust collector 130 and the inner wall of the dust collector housing 135 even without a user's input through the operation unit 200. Through this, the foreign substances present outside the dust collector 130 and the ions cause a sterilization reaction to remove the foreign substances.

The controller 400 may control the photocatalyst LED 163 to generally emit visible light. More specifically, the cleaner station 10 may further include a power supply unit 500 that receives power from an external power source and supplies power necessary for operation of each component. In this case, the power supply unit 500 may be controlled by the controller 400, and may be controlled to supply necessary power to the photocatalyst LED 163 when external power is applied to the cleaner station 10.

The controller 400 may operate the dust bin sterilization LED 164 to emit ultraviolet light. More specifically, when the user inputs a command for setting the dust bin sterilization mode through the operation unit 200, a control signal corresponding to the dust bin sterilization mode is transmitted to the controller 400. When receiving the control signal corresponding to the dust bin sterilization mode, the controller 400 may control to operate the dust bin sterilization LED 164 to emit ultraviolet light toward the inside of the dust bin 2160 of the cleaner 20. Through this, the foreign substances present within the dust bin 2160 of the cleaner 20 and the ultraviolet light cause a sterilization reaction to remove the foreign substances.

Hereinafter, a method for controlling the cleaner station which includes the sterilization method using the collector external sterilization unit 160 will be described with reference to flowcharts of FIGS. 16, 17, and 18.

Figure 16:
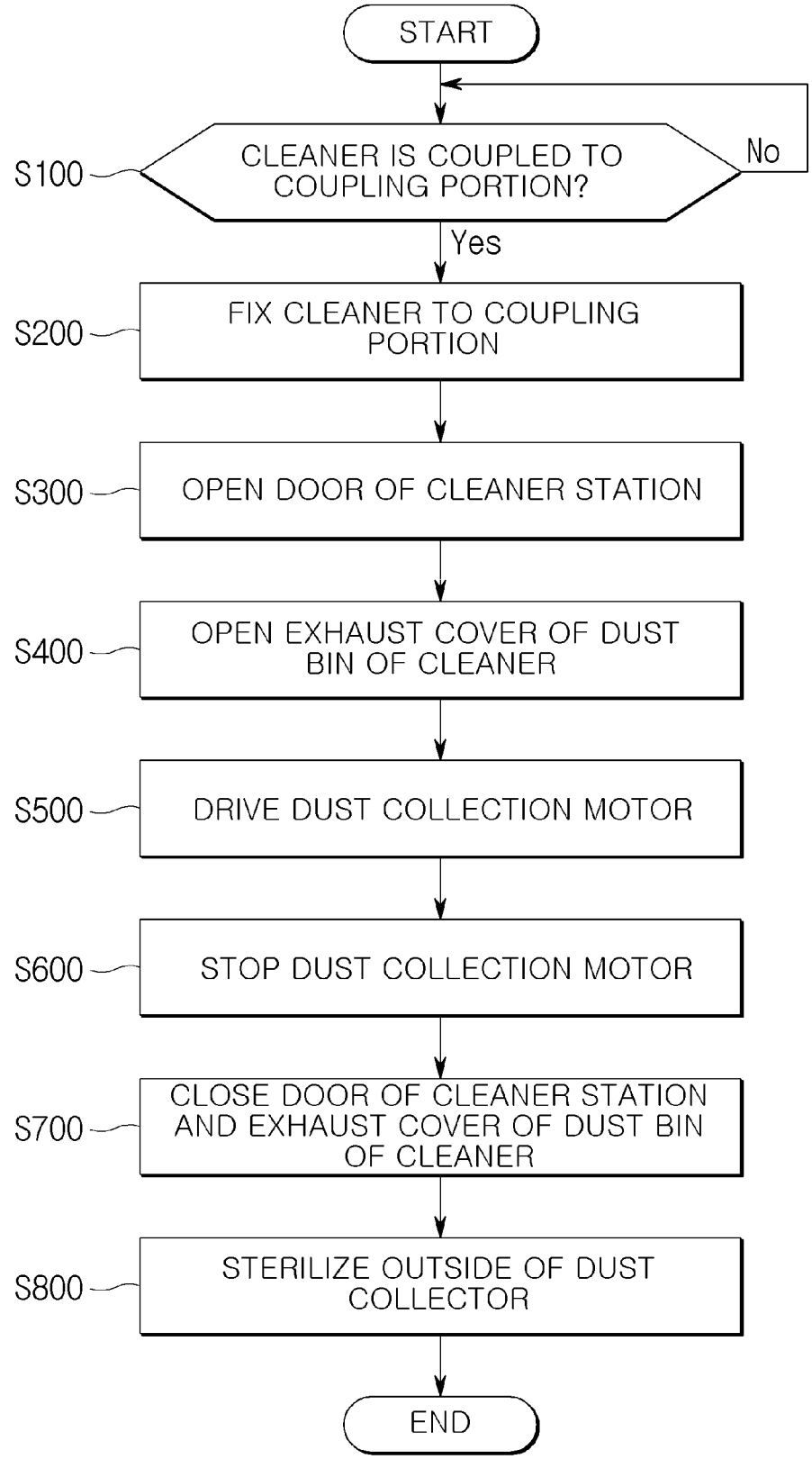
FIG. 16 is a flowchart showing a flow of a method for controlling the cleaner station according to the embodiment of the present disclosure.

FIG. 16 is a flowchart showing a flow of a method for controlling the cleaner station 10 according to the embodiment of the present disclosure.

Referring to FIG. 16, the method for controlling the cleaner station 10 according to the embodiment of the present disclosure may be performed by the cleaner station 10 described above.

First, the controller 400 determines whether the cleaner 20 is coupled to the coupling portion 115 of the cleaner station 10 (S100). Here, whether or not the cleaner 20 is coupled to the coupling portion 115 can be determined through whether or not power is supplied to the battery through the coupling sensor 1154 and/or the charging part 1156.

When it is determined that the cleaner 20 is coupled to the coupling portion 115, the controller 400 may operate the fixing portion motor 192 to fix the cleaner 20 to the coupling portion 115 (S200). The fixing member 191 receiving power from the fixing portion motor 192 moves from the inside of the side wall 1155 toward the dust bin 2160 to connect the dust bin body 2161 and the battery housing 2150 to the coupling portion 115) can be fixed.

When the cleaner 20 is fixed to the coupling portion 115, the door 181 is opened such that the outside and inside of the cleaner station 10 communicate with each other (S300). At this time, the door 181 is opened by the controller 400. may be performed by controlling the door motor 183.

Then, the exhaust cover 2162 that opens and closes the dust bin 2160 of the cleaner 20 is opened (S400). The controller 400 may control to operate the cover opening motor in order to open the exhaust cover 2162, so that the push protrusion 171 presses the coupling lever 2163 coupled to the exhaust cover 2162.

When the door 181 and the exhaust cover 2162 are opened and the inside of the dust bin 2160 and the suction tube 140 communicate, the controller 400 may drive the dust collection motor 120 (S500). Accordingly, a suction force is generated within the cleaner station 10 in a direction toward the dust collector 130, so that the dust within the dust bin 2160 is collected to the dust collector 130 of the cleaner station 10.

The controller 400 may control the dust collection motor 120 to be driven for a predetermined period of time. That is, the controller 400 may stop the driving of the dust collection motor 120 after the predetermined period of time elapses (S600).

The controller 400 may close the door 181 of the cleaner station 10 after stopping the driving of the dust collection motor 120 (S700). Here, the controller 400 may operate the door motor 183 in order to close the door 181. When the dust passage hole 1151a is completely closed by the operation of the door motor 183, the exhaust cover 2162 is also coupled to the dust bin body 2161 again and the dust bin 2160 can be closed.

After the door 181 and the exhaust cover 2162 are closed, a collector external sterilization step may be performed in which the collector external sterilization unit 160 causes a sterilization reaction on foreign substances present outside the dust collector 130 (S800). Here, not only the collector external sterilization step is performed but also a collector internal sterilization step may be performed in which a sterilization reaction is caused on foreign substances present within the dust collector 130.

In the collector internal sterilization step, the controller 400 may control the collector sterilizing LED 151 to operate for a predetermined period of time to emit ultraviolet light toward the inside of the dust collector 130.

Figure 17:
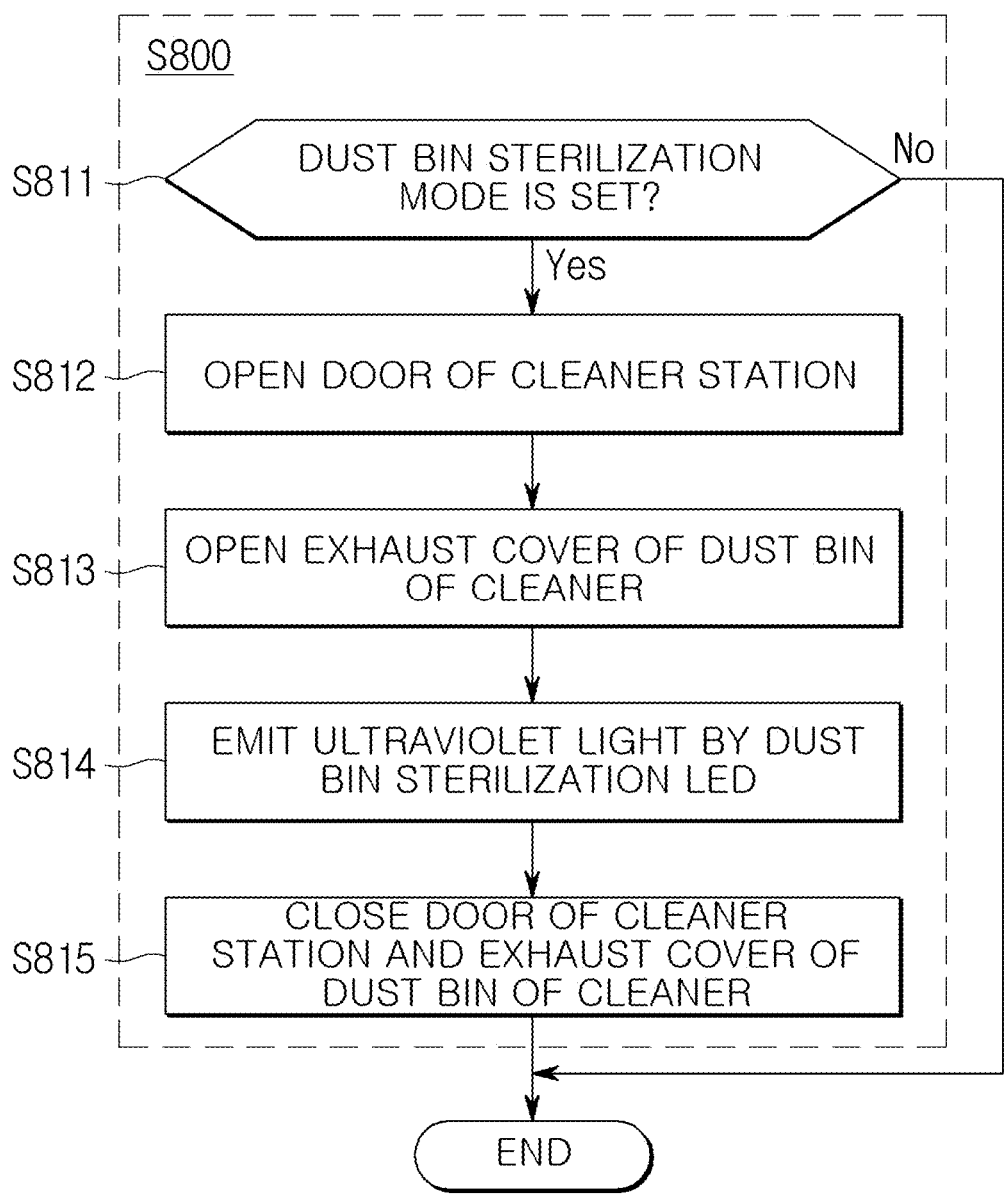
FIG. 17 is a flowchart showing a flow according to the embodiment in which a dust bin sterilization mode is set in a collector external sterilization step of FIG. 16.

FIG. 17 is a flowchart showing a flow according to the embodiment in which a dust bin sterilization mode is set in the collector external sterilization step of FIG. 16.

When the exhaust cover 2162 and the door 181 are closed (S700) after the driving of the dust collection motor 120 is completed (S500), the controller 400 may determine whether the dust bin sterilization mode in which the dust bin 2160 is sterilized is set or not (S811). The dust bin sterilization mode can be set by a user's input through the operation unit 200. Here, a control signal corresponding to the input for setting the dust bin sterilization mode is transmitted to the controller 400.

When receiving the control signal corresponding to the input for setting the dust bin sterilization mode, the controller 400 may determine that the dust bin sterilization mode is set and may open the door 181 of the cleaner station 10 (S812). As described above, the opening of the door 181 may be performed by that the controller 400 drives the door motor 183.

When the door 181 is opened, the controller 400 can open the exhaust cover 2162 of the dust bin 2160 (S813). As described above, the opening of the exhaust cover 2162 may be performed by that the controller 400 drives the cover opening motor and that the push protrusion 171 presses the coupling lever 2163 of the discharge cover 2162.

When both the door 181 and the exhaust cover 2162 are opened, the controller 400 may control to operate the dust bin sterilization LED 164 to emit ultraviolet light (S814). Here, the controller 400 may control the dust bin sterilization LED 164 to operate for a predetermined period of time to emit ultraviolet light, thereby causing a sterilization reaction on the foreign substances present within the dust bin 2160.

When the operation of the dust bin sterilization LED 164 is completed, the controller 400 may close the door 181 of the cleaner station. Here, the controller 400 may operate the door motor 183 in order to close the door 181. When the dust passage hole 1151a is completely closed by the operation of the door motor 183, the exhaust cover 2162 is also coupled to the dust bin body 2161 again and the dust bin 2160 can be closed (S815).

Figure 18:
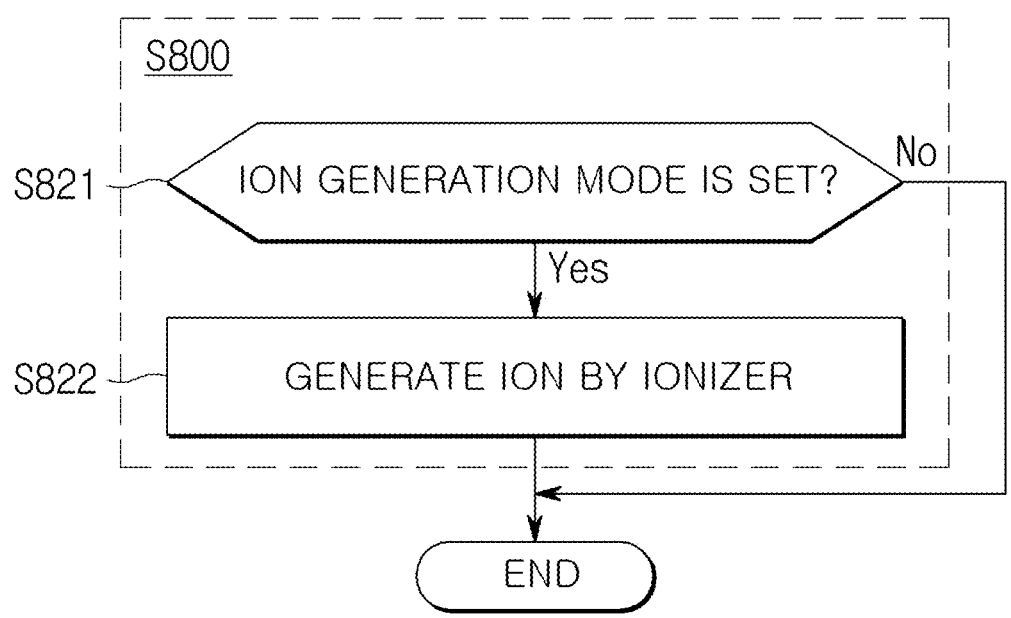
FIG. 18 is a flowchart showing a flow according to the embodiment in which an ion generation mode is set in the collector external sterilization step of FIG. 16.

FIG. 18 is a flowchart showing a flow according to the embodiment in which the ion generation mode is set in the collector external sterilization step of FIG. 16.

When the exhaust cover 2162 and the door 181 are closed (S700) after the driving of the dust collection motor 120 is completed (S600), the controller 400 may control the ionizer 161 to generate ions in a space between the outer wall of the dust collector 130 and the inner wall of the dust collector housing 135 (S822) even without setting the ion generation mode by the user. That is, regardless of whether the ion generation mode is set or not, immediately after the driving of the dust collection motor 120 is completed (S600) or when a predetermined period of time elapses after the driving of the dust collection motor 120 is completed, the controller may control the ionizer 161 to operate.

Alternatively, when the exhaust cover 2162 and the door 181 are closed (S700) after the driving of the dust collection motor 120 is completed (S600), the controller 400 may determine whether the ion generation mode in which ions are generated by the ionizer 161 is set (S821). Only when the ion generation mode is set, the controller may control the ionizer 161 to operate. The ion generation mode can be set by a user's input through the operation unit 200. Here, a control signal corresponding to the input for setting the ion generation mode is transmitted to the controller 400.

When receiving the control signal corresponding to the input for setting the ion generation mode, the controller 400 may determine that the ion generation mode is set and may drive the ionizer 161 (S822). When the ionizer 161 is driven, ions may be generated in a space between the outer wall of the dust collector 130 and the inner wall of the dust collector housing 135 which receives the dust collector.

As described above, according to the embodiment of the present disclosure, the ionizer that generates ions in a space between the outer wall of the dust collector and the inner wall of the dust collector housing is provided, so that foreign substances present on the outer surface of the dust collector are sterilized, and thus, the cleaner station can be hygienically managed.

Also, according to the embodiment of the present disclosure, since the photocatalyst filter is coupled to the top of the HEPA filter, the photocatalyst reaction can occur before air sucked together with dust into the cleaner station is exhausted, thereby removing odors from the exhaust air.

Also, according to the embodiment of the present disclosure, the dust bin sterilization LED that emits ultraviolet light in a state where the cleaner is coupled to the cleaner station after a process of collecting dust in the dust bin of the cleaner is completed is provided in the dust bin of the cleaner, so that the foreign substances present within the dust bin of the cleaner are sterilized, thereby providing a user with convenience for hygiene management of the cleaner.

Although the foregoing has described a specific embodiment of the present disclosure, it can be understood by those skilled in the art that the present disclosure is not limited to the illustrated embodiment and can be variously changed and modified to other specific embodiments without departing from the spirit and scope of the present disclosure. Therefore, the scope of the present disclosure should be determined not by the described embodiments but by the spirit as defined by the appended claims.

The invention claimed is:

1. A cleaner station comprising:
   a housing configured to couple to a cleaner;
   a dust collection motor disposed in the housing and configured to generate suction force for suctioning dust from a dust bin of the cleaner;
   a dust collector disposed in the housing and disposed above the dust collection motor, the dust collector being configured to receive the dust suctioned from the dust bin of the cleaner; and
   a collector external sterilizer disposed in the housing and configured to cause a sterilization reaction on foreign substances that are disposed outside the dust collector.

2. The cleaner station of claim 1, wherein the collector external sterilizer comprises an ionizer configured to generate ions.

3. The cleaner station of claim 2, further comprising a high efficiency particulate air (HEPA) filter disposed in the housing and configured to filter foreign substances in air suctioned by the dust collection motor,
   wherein the HEPA filter is disposed below the dust collection motor, and the ionizer is disposed above the HEPA filter.

4. The cleaner station of claim 2, further comprising a dust collector housing that is disposed in the housing and accommodates the dust collector,
   wherein the ionizer is coupled to the dust collector housing and configured to generate ions in a space defined between an outer wall of the dust collector and an inner wall of the dust collector housing.

5. The cleaner station of claim 4, wherein the ionizer is disposed at a top surface of the dust collector housing.

6. The cleaner station of claim 1, wherein the collector external sterilizer comprises:
   a photocatalyst filter that is disposed in the housing and includes a photocatalyst configured to react to visible light; and
   a photocatalyst light emitting diode (LED) disposed below the photocatalyst filter and configured to emit visible light.

7. The cleaner station of claim 6, further comprising a high efficiency particulate air (HEPA) filter disposed in the housing and disposed below the dust collection motor, the HEPA filter being configured to filter foreign substances in air suctioned by the dust collection motor,
   wherein the HEPA filter is disposed between the photocatalyst filter and the photocatalyst LED, and
   wherein the photocatalyst LED is configured to emit the visible light toward the photocatalyst filter.

8. The cleaner station of claim 6, wherein the photocatalyst filter is disposed below the dust collection motor.

9. The cleaner station of claim 8, further comprising a high efficiency particulate air (HEPA) filter disposed in the housing and configured to filter foreign substances in air suctioned by the dust collection motor,
wherein the HEPA filter is disposed between the photocatalyst filter and the photocatalyst LED, and
wherein the photocatalyst LED is configured to emit the visible light toward the photocatalyst filter through the HEPA filter.

10. The cleaner station of claim 1, further comprising a suction tube disposed in the housing and configured to guide air flow including the dust from the dust bin to the dust collector based on the dust collection motor generating the suction force,
wherein the collector external sterilizer comprises a dust bin sterilization light emitting diode (LED) disposed in the suction tube and configured to emit ultraviolet light.

11. The cleaner station of claim 10, wherein the dust bin sterilization LED is configured to face a bottom surface of the dust bin based on the dust bin being coupled to the housing.

12. The cleaner station of claim 11, wherein the housing is configured to accommodate a portion of the cleaner and to support a circumferential surface of the dust bin such that the bottom surface of the dust bin is orientated in a vertical direction.

13. The cleaner station of claim 1, wherein the housing defines a dust bin guide surface configured to support a circumferential surface of the dust bin, and
wherein the cleaner station further comprises a door configured to face a bottom surface of the dust bin based on the dust bin guide surface supporting the circumferential surface of the dust bin.

14. The cleaner station of claim 13, further comprising a door arm connected to the door and a door motor, the door motor configured to move the door arm to thereby open the door.

15. The cleaner station of claim 14, wherein the dust bin comprises an exhaust cover configured to open and close the bottom surface of the dust bin, the exhaust cover being configured to open the bottom surface of the dust bin based on the door being opened.

16. The cleaner station of claim 13, wherein the collector external sterilizer comprises a dust bin sterilization light emitting diode (LED) disposed in the housing and configured to emit ultraviolet light toward the bottom surface of the dust bin based on the door being opened.

17. The cleaner station of claim 16, further comprising a suction tube disposed in the housing and configured to guide air flow including the dust from the dust bin to the dust collector based on the dust collection motor generating the suction force,
wherein the dust bin sterilization LED is disposed in the suction tube.

18. A method for controlling a cleaner station configured to couple to a cleaner, the cleaner station including a dust collection motor configured to generate suction force for suctioning dust from a dust bin of the cleaner, the method comprising:
driving the dust collection motor;
determining whether a dust bin sterilization mode is set after the dust collection motor is driven;
based on determining that the dust bin sterilization mode is set, opening a door disposed in the cleaner station to thereby fluidly communicate an outside of the cleaner station and an inside of the cleaner station with each other;
opening an exhaust cover configured to open and close the dust bin; and
emitting ultraviolet light toward an inside of the dust bin by a dust bin sterilization light emitting diode (LED) that is disposed in the cleaner station.

19. A method for controlling a cleaner station configured to couple to a cleaner and to remove dust from a dust bin of the cleaner, the cleaner station including a dust collection motor, an ionizer, a dust collector configured to receive the dust, and a dust collector housing that accommodates the dust collector, the method comprising:
driving the dust collection motor to thereby cause the dust from the dust bin to be collected in the dust collector; and
generating, by the ionizer, ions in a space defined between an outer wall of the dust collector and an inner wall of the dust collector housing.

20. The method of claim 19, further comprising:
after collecting the dust to the dust collector and before generating the ions, determining whether an ion generation mode is set for generating ions by the ionizer.

* * * * *